US012067814B1

(12) United States Patent
Skrzypchak et al.

(10) Patent No.: US 12,067,814 B1
(45) Date of Patent: Aug. 20, 2024

(54) MARINE MOTOR ASSEMBLY AND METHOD FOR TESTING A WATER RESISTANCE OF A MOTOR UNIT HOUSING OF A MARINE MOTOR ASSEMBLY

(71) Applicant: BRP US INC., Sturtevant, WI (US)

(72) Inventors: Mark J Skrzypchak, Pleasant Prairie, WI (US); Nathan Blank, Burlington, WI (US); Kenneth Chung, Lindenhurst, IL (US)

(73) Assignee: BRP US Inc., Sturtevant, WI (US)

( * ) Notice: Subject to any disclaimer, the term of this patent is extended or adjusted under 35 U.S.C. 154(b) by 284 days.

(21) Appl. No.: 17/582,509

(22) Filed: Jan. 24, 2022

Related U.S. Application Data

(60) Provisional application No. 63/143,651, filed on Jan. 29, 2021.

(51) Int. Cl.

| | |
|---|---|
| ***G07C 5/08*** | (2006.01) |
| ***B63B 79/10*** | (2020.01) |
| ***B63H 20/02*** | (2006.01) |
| ***B63H 20/10*** | (2006.01) |
| ***B63H 20/24*** | (2006.01) |
| ***B63H 20/32*** | (2006.01) |
| ***F02M 35/10*** | (2006.01) |

(52) U.S. Cl.
CPC ............ *G07C 5/0808* (2013.01); *B63B 79/10* (2020.01); *B63H 20/02* (2013.01); *B63H 20/10* (2013.01); *B63H 20/24* (2013.01); *B63H 20/32* (2013.01); *F02M 35/1015* (2013.01); *G07C 5/0816* (2013.01); *G07C 5/0841* (2013.01)

(58) Field of Classification Search
CPC .. G07C 5/0808; G07C 5/0816; G07C 5/0841; B63B 79/10; B63H 20/02; B63H 20/10; B63H 20/24; B63H 20/32; F02M 35/1015
See application file for complete search history.

(56) References Cited

U.S. PATENT DOCUMENTS 2,207,372 A 7/1940 Clarke
2,216,496 A 10/1940 Mackay
(Continued)

OTHER PUBLICATIONS

Yamaha F115 Service Manual (Year: 2000).*
How to vacuum and pressure test an outboard lower end https://www.youtube.com/watch?v=hf2Kg4crhWY (Year: 2020).*

*Primary Examiner* — Anshul Sood
*Assistant Examiner* — Oliver Tan
(74) *Attorney, Agent, or Firm* — BCF LLP

(57) ABSTRACT

A marine motor assembly for mounting to a watercraft is disclosed. The marine motor assembly has a motor unit including a motor unit housing, a motor, a propulsion device, an air pump fluidly communicating with an under-housing volume of the motor unit housing, a pressure sensor for measuring air pressure in the under-housing volume, and a control unit communicating with the air pump and the pressure sensor. The control unit is programmed for controlling the air pump for changing air pressure in the under-housing volume, and monitoring change in the air pressure for a predetermined amount of time for confirming that the motor unit housing is water-resistant, or that the water resistance of the motor unit housing is compromised. A method for testing a water resistance of a motor unit housing of a marine motor assembly is also disclosed.

23 Claims, 17 Drawing Sheets

(56) References Cited

U.S. PATENT DOCUMENTS

| | | | | |
|---|---|---|---|---|
| 2,773,353 | A * | 12/1956 | Oishel | F15B 11/06 49/70 |
| 3,164,122 | A | 1/1965 | Morris | |
| 3,269,351 | A | 8/1966 | Shimanckas | |
| 3,452,704 | A | 6/1969 | Cothron | |
| 3,911,853 | A | 10/1975 | Strang | |
| 4,178,873 | A | 12/1979 | Bankstahl | |
| 4,504,237 | A | 3/1985 | Blanchard | |
| 4,559,018 | A | 12/1985 | Harada et al. | |
| 4,666,410 | A | 5/1987 | Anselm | |
| 4,726,799 | A | 2/1988 | Harada et al. | |
| 4,773,215 | A | 9/1988 | Litjens et al. | |
| 5,176,551 | A | 1/1993 | Blanchard et al. | |
| 5,344,350 | A | 9/1994 | Hatch | |
| 5,472,361 | A | 12/1995 | Fujimoto et al. | |
| 5,562,511 | A | 10/1996 | Blanchard et al. | |
| 5,996,734 | A | 12/1999 | Blanchard et al. | |
| 6,296,535 | B1 * | 10/2001 | Bland | B63H 20/10 440/61 R |
| 6,364,724 | B1 * | 4/2002 | Nozawa | F02B 61/045 277/637 |
| 7,510,451 | B2 | 3/2009 | Inaba | |
| 7,736,206 | B1 | 6/2010 | Wiatrowski | |
| D714,345 | S | 9/2014 | Petit et al. | |
| 8,826,845 | B2 | 9/2014 | Mochizuki et al. | |
| 8,858,282 | B2 | 10/2014 | Lonnborg et al. | |
| 9,051,041 | B2 | 6/2015 | Litjens et al. | |
| 9,216,795 | B2 | 12/2015 | McGill, Jr. | |
| 9,254,904 | B2 | 2/2016 | Minoura | |
| 9,296,456 | B2 | 3/2016 | Mochizuki et al. | |
| 9,499,247 | B1 | 11/2016 | Wiatrowski et al. | |
| 10,850,820 | B1 | 12/2020 | Minogue | |
| 11,180,235 | B2 | 11/2021 | Wiatrowski | |
| 2003/0182049 | A1 * | 9/2003 | Bale | F02M 26/33 701/108 |
| 2003/0234041 | A1 * | 12/2003 | Boulot | B60C 23/0408 73/146 |
| 2015/0122214 | A1 * | 5/2015 | Etherington-Smith | F02M 35/165 137/40 |
| 2019/0233073 | A1 | 8/2019 | Wiatrowski | |

* cited by examiner

MARINE MOTOR ASSEMBLY AND METHOD FOR TESTING A WATER RESISTANCE OF A MOTOR UNIT HOUSING OF A MARINE MOTOR ASSEMBLY

CROSS-REFERENCE

The present application claims priority to U.S. Provisional Patent Application No. 63/143,651, entitled "Marine Motor Assembly and Method for Testing a Water Resistance of a Motor Unit Housing of a Marine Motor Assembly," filed Jan. 29, 2021, the entirety of which is incorporated herein by reference.

TECHNICAL FIELD

The present technology relates to marine motor assemblies and to methods for testing a water resistance of a motor unit housing of a marine motor assembly.

BACKGROUND

A typical marine outboard motor assembly is formed from a motor unit having a motor, such as an internal combustion engine, a lower unit with a propeller, and a midsection connecting the motor to the propeller. The motor (or motor unit) is enclosed in a motor unit housing.

The outboard motor assembly is generally connected to its corresponding watercraft by a transom or mounting bracket, typically connected to the midsection, below the motor unit. The bracket connects to a rear portion of the watercraft, such that the motor unit and part of the midsection is well above the water. In some cases, however, it could be preferable to have a marine outboard motor which is disposed lower relative to the watercraft to allow more useable room in the watercraft for example.

However, by positioning the marine outboard motor lower, a portion of the motor unit, and therefore the motor, will likely be below the water level at least some of the time, risking water intrusion in the motor unit housing. As a portion of the motor unit is likely to be below the water level some of the time, the motor unit housing is intended to be water-resistant to prevent water infiltration to a certain degree into an under-housing volume defined between the motor unit housing and the motor unit.

Therefore, there is a desire for a marine motor assembly having features assisting in the prevention of water intrusion in the motor and in the motor unit housing, and there is a desire for testing that the motor unit housing is water-resistant to the desired degree.

SUMMARY

It is an object of the present technology to ameliorate at least some of the inconveniences present in the prior art.

According to one aspect of the present technology, there is provided a marine motor assembly for mounting to a watercraft. The marine motor assembly includes a motor unit having a motor unit housing, a motor disposed inside the motor unit housing, a propulsion device operatively connected to the motor, an air pump fluidly communicating with an under-housing volume of the motor unit housing, a pressure sensor fluidly communicating with the under-housing volume for measuring air pressure in the under-housing volume of the motor unit housing, and a control unit communicating with the air pump and the pressure sensor. The control unit is programmed for controlling the air pump for changing air pressure in the under-housing volume of the motor unit housing, and monitoring change in the air pressure for a predetermined amount of time. Following the predetermined amount of time, in response to determining that the change in air pressure is within a predetermined range, confirming that the motor unit housing is water-resistant, and in response to determining that the change in air pressure is outside the predetermined range, indicating that the water resistance of the motor unit housing is compromised.

In some implementations, the air pump fluidly communicates to an exterior of the motor unit housing.

In some implementations, the pressure sensor is disposed inside the motor unit housing.

In some implementations, the control unit is disposed inside the motor unit housing.

In some implementations, the control unit is programmed for controlling the air pump to reduce air pressure in the under-housing volume.

In some implementations, the control unit is programmed for controlling the air pump to stop the air pump when the air pressure in the under-housing volume reaches a predetermined air pressure.

In some implementations, the predetermined amount of time is a first predetermined amount of time, and the control unit is programmed for generating a fault signal in response to determining that the air pressure fails to reach a predetermined air pressure within a second predetermined amount of time following an activation of the air pump.

In some implementations, the motor is an internal combustion engine. The motor unit housing defines an air intake opening fluidly communicating an exterior of the motor unit housing with the under-housing volume of the motor unit housing. The motor unit further includes an air intake assembly disposed in the motor unit housing, the air intake assembly defining an air inlet fluidly communicating with the air intake opening, the air intake assembly being fluidly connected to the at least one combustion chamber for supplying air to the at least one combustion chamber, the air intake assembly including a throttle valve. The marine motor assembly further includes an exhaust system fluidly communicating with the at least one combustion chamber for conveying exhaust gases from the at least one combustion chamber to an exterior of the marine motor assembly, the exhaust system defining an exhaust outlet, the air intake assembly, the at least one combustion chamber, and the exhaust system together defining at least in part a gas flow pathway, the air intake opening defining an upstream end of the gas flow pathway, the exhaust outlet defining a downstream end of the gas flow pathway. A sealing valve is provided in the gas flow pathway between the air intake opening and the exhaust outlet, the sealing valve having an open position permitting flow of gas therethrough, and the sealing valve having a closed position preventing flow of gas therethrough for sealing a portion of the gas flow pathway downstream of the sealing valve from a portion of the gas flow pathway upstream of the sealing valve.

In some implementations, the air inlet is fluidly communicating with the air intake opening and the under-housing volume of the motor unit housing, the gas flow pathway being defined at least in part by the under-housing volume of the motor unit housing.

In some implementations, the marine motor assembly further includes a service plug selectively connected to the motor unit housing for sealing the air intake opening.

In some implementations, the air pump is controlled for changing air pressure in the under-housing volume in response to the sealing valve being in the closed position, and the service plug being connected to the motor unit housing for sealing the air intake opening.

In some implementations, the service plug includes at least one of a pressure gauge, a connector for selectively supplying air through the service plug, and a blow-off valve.

In some implementations, the air pump is disposed inside the motor unit housing, and the air pump is configured for supplying air downstream of the sealing valve from the under-housing volume of the motor unit housing.

In some implementations, in the closed position, the sealing valve hermetically seals the portion of the gas flow pathway downstream of the sealing valve from the portion of the gas flow pathway upstream of the sealing valve.

In some implementations, the sealing valve is disposed upstream of the engine.

In some implementations, the sealing valve is disposed downstream of the throttle valve.

In some implementations, the air pump supplies air to the gas flow pathway at a position upstream of the engine.

In some implementations, the air intake assembly includes an intake manifold fluidly connected to the engine, and the air pump supplies air in the air intake manifold.

In some implementations, the marine motor assembly further includes a valve actuator operatively connected to the sealing valve, the control unit communicating with the valve actuator, and the control unit is programmed for sending a closing signal to the valve actuator to close the sealing valve.

In some implementations, in response to the sealing valve failing to close in response to the closing signal, the control unit is programmed for generating a fault signal.

In some implementations, the air pump supplies air in the air intake assembly.

In some implementations, the marine motor assembly further includes a lower unit connected to the motor unit, the lower unit including a lower unit housing fastened to at least one of the internal combustion engine and the motor unit housing, a transmission disposed in the lower unit housing, the transmission being operatively connected to the engine, and the propulsion device being operatively connected to the transmission.

In some implementations, the propulsion device is a propeller, and the exhaust outlet is defined in the propeller.

In some implementations, the marine motor assembly further includes an external conduit fluidly connected to the air intake opening and being disposed externally of the motor unit housing, at least one line extending from a component disposed inside the motor unit housing, the at least one line extending inside the external conduit, the at least one line being at least one of a power line, a communication line and a fuel line, and at least one grommet disposed between the at least one line and the motor unit housing for sealing the motor unit housing and pass-through of the at least one line.

In some implementations, the marine motor assembly further includes a transom bracket connected to the motor unit housing. The transom bracket defines a tilt-trim axis, and a center of mass of the motor is disposed below the tilt-trim axis at least when the marine motor assembly is in a trim range.

In accordance with another aspect of the present technology, there is provided a method for testing a water resistance of a motor unit housing of a marine motor assembly. The method includes changing air pressure in an under-housing volume of the motor unit housing, monitoring change in the air pressure for a predetermined amount of time, and following the predetermined amount of time, in response to determining that the change in air pressure is within a predetermined range, confirming that the motor unit housing is water-resistant, and in response to determining that the change in air pressure is outside the predetermined range, indicating that the water resistance of the motor unit housing is compromised.

In some implementations, the method further includes closing an air intake opening of the motor unit housing fluidly communicating an exterior of the motor unit housing with the under-housing volume of the motor unit housing, and closing a sealing valve provided in a gas flow pathway of the marine motor assembly for sealing a portion of the gas flow pathway downstream of the sealing valve from a portion of the gas flow pathway upstream of the sealing valve, the gas flow pathway being defined at least in part by an air intake assembly fluidly connected to the air intake opening, at least one combustion chamber, and an exhaust system of the marine motor assembly.

In some implementations, closing the air intake opening includes connecting a service plug to the motor unit housing.

In some implementations, closing the sealing valve includes sending a closing signal to a valve actuator to close the sealing valve. The method further includes sensing a position of the sealing valve and generating a fault signal in response to the sealing valve failing to close in response to the closing signal.

In some implementations, changing air pressure in the under-housing volume of the motor unit housing further includes controlling an air pump fluidly communicating with the under-housing volume of the motor unit housing.

In some implementations, controlling the air pump includes reducing the air pressure in the under-housing volume of the motor unit housing.

In some implementations, monitoring change in the air pressure further includes determining if the air pressure in the under-housing volume of the motor unit housing has reached a predetermined air pressure, and in response to determining that the air pressure fails to reach the predetermined air pressure, indicating that the water resistance is compromised.

In some implementations, the predetermined amount of time is a first predetermined amount of time, and monitoring change in the air pressure further includes determining if the air pressure in the under-housing volume of the motor unit housing has reached the predetermined air pressure within a second predetermined amount of time, and in response to determining that the air pressure is not reached within the second predetermined amount of time, indicating that the water resistance of the motor unit housing is compromised.

In some implementations, monitoring change in the air pressure further includes determining if the air pressure in the under-housing volume of the motor unit housing has reached a predetermined air pressure following an activation of the air pump, controlling the air pump to stop pumping air in response to determining that the air pressure in the under-housing volume of the motor unit housing has reached the predetermined air pressure, and the predetermined amount of time is a predetermined amount of time after the air pump is stopped.

In some implementations, the predetermined amount of time is a first predetermined amount of time, and monitoring change in the air pressure further includes determining that the air pressure in the under-housing volume of the motor unit housing has reached a predetermined air pressure within a second predetermined amount of time, and controlling the air pump to stop pumping air in response to determining that the air pressure in the under-housing volume of the motor unit housing has reached the predetermined air pressure within the second predetermined amount of time, the first predetermined amount of time is a predetermined amount of time after the air pump is stopped.

In some implementations, the method further includes controlling the air pump to stop pumping air in response to determining that the air pressure in the under-housing volume of the motor unit housing has reached the predetermined air pressure.

In some implementations, indicating that the water resistance is compromised includes at least one of providing a warning indication to an operator of the test, registering a fault code, and supplying compressed air in the under-housing volume of the motor unit housing.

For purposes of this application, terms related to spatial orientation such as forward, rearward, upward, downward, left, and right, should be understood in a frame of reference of the marine motor assembly, as it would be mounted to a watercraft with a motor unit in a neutral trim position. Terms related to spatial orientation when describing or referring to components or sub-assemblies of the motor assembly separately therefrom should be understood as they would be understood when these components or sub-assemblies are mounted in the marine motor assembly, unless specified otherwise in this application. The terms "upstream" and "downstream" should be understood with respect to the normal flow direction of fluid inside a component. As such, in an assembly including an internal combustion engine, the air intake system is upstream of the engine and the exhaust system is downstream of the engine. Similarly, for a component having an inlet and an outlet, the inlet is upstream of the outlet, and the outlet is downstream of the inlet.

The term "hermetically sealed" should be understood to mean that the passage of gas through the associated device is prevented, such as in an airtight manner. The term "water-resistant" should be understood to mean that the intrusion of water through the associated device is prevented to some degree but not entirely, and this term is to be understood as not being equivalent to expressions such as "waterproof" or "watertight" meaning that the associated device is impervious to water. It should also be understood that a device that is "waterproof" or "watertight" is also "water-resistant", but that a device that is "water-resistant" is not necessarily "waterproof" or "watertight". The term "under-housing volume" should be understood to mean the volume defined under the motor unit housing and not being occupied by the motor unit. In other words, the "under-housing volume" is the residual volume between the interior walls of the motor unit housing and the motor unit.

Explanations and/or definitions of terms provided in the present application take precedence over explanations and/or definitions of these terms that may be found in any documents incorporated herein by reference.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in a marine motor assembly 100 that is used to propel a watercraft and is configured to be disposed under the deck of the watercraft it propels. It is contemplated that the marine motor assembly 100 may be disposed at a transom 15 of a watercraft, but not beneath its deck and that aspects of the present technology could be used in other types of marine motor assemblies, such as in a marine outboard motors having a motor unit, a midsection connected below the motor unit, a lower unit connected below the midsection, and a transom bracket configured to connect the midsection to a watercraft.

Figure 1:
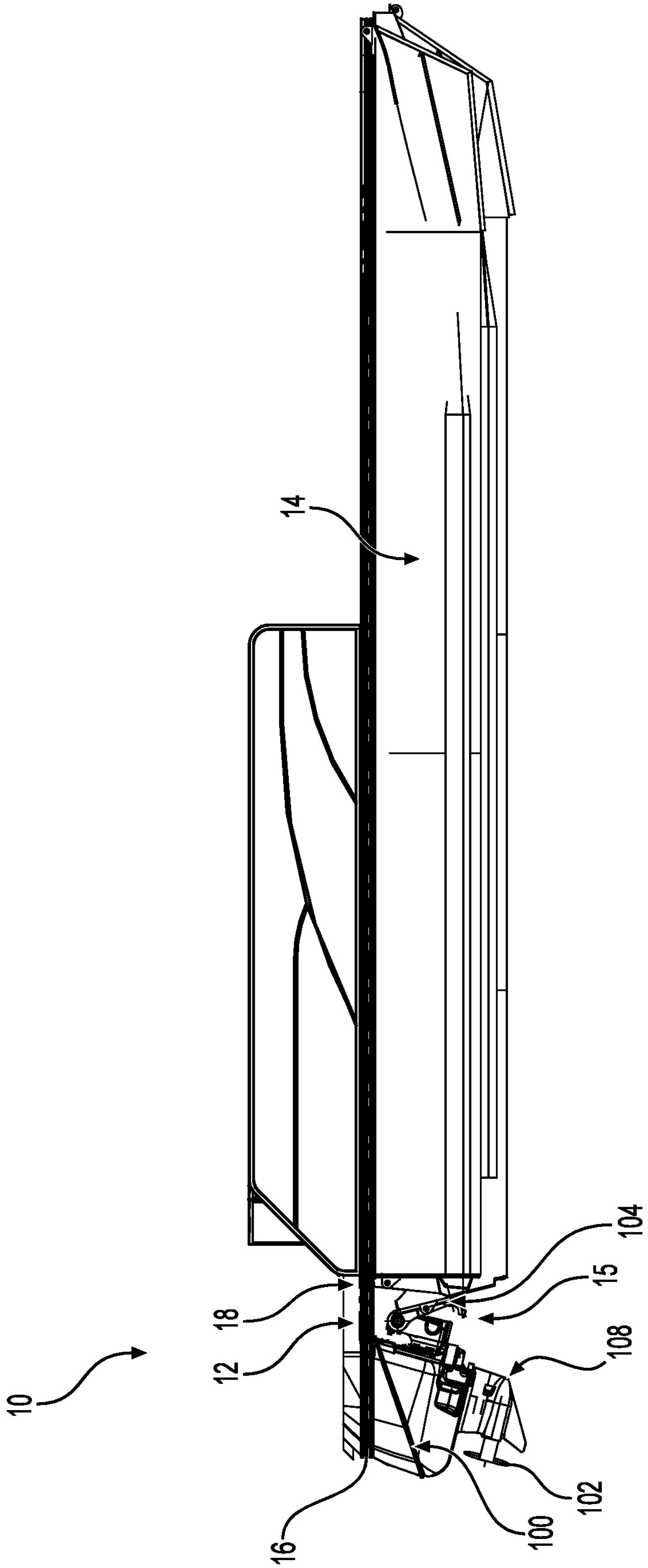
FIG. 1 is a right side elevation view of a watercraft having a marine motor assembly according to the present technology.

In FIG. 1, a watercraft 10 is illustrated. The watercraft 10 is specifically a pontoon boat 10, but this is simply one non-limiting example of a watercraft according to the present technology. This particular implementation of the boat 10 includes a watercraft body 12 formed generally from two pontoons 14 (only one being illustrated) and a platform 16.

The boat 10 also includes a marine motor assembly 100, also referred to herein as the assembly 100. The assembly 100 is pivotably and rotatably connected to the watercraft body 12 for providing propulsion via a propulsion device 102. The propulsion device 102 is specifically a propeller 102 in the present implementation, but it is contemplated that the propulsion device 102 could be different in some implementations.

The assembly 100 includes a transom bracket 104 which is fastened to the watercraft body 12. The transom bracket 104 is connected to a transom 15 of the boat 10, such that the assembly 100 is generally disposed below a top surface 18, also called the deck 18, of the platform 16 laterally between the pontoons 14.

With additional reference to FIGS. 2 to 7, the marine motor assembly 100, shown separately from the watercraft 10, will now be described in more detail. The assembly 100 includes a motor unit 106, a lower unit 108, and the transom bracket 104.

The motor unit 106 includes a motor unit housing 110 for supporting and covering components disposed therein. The motor unit housing 110 is water-resistant such that water in which the motor unit housing 110 is immersed is impeded from entering the motor unit housing 110 during normal operating conditions, including when at rest. The motor unit housing 110 is water-resistant to a certain degree. In the present implementation, the motor unit housing 110 has a water resistance rating of IP69K, which is dust proof and submersion resistant up to a meter. In other words, water directed against the motor unit housing 110 from any direction does not have harmful effects or impair performance of the motor unit 106. In addition, the "K" in the IP69K rating indicates resistance to a high pressure heated jet stream from a few inches away (i.e. cleaning by a heated pressure washer). In other implementations, it is contemplated that motor unit housing 110 has a water resistance rating of IP68 or IP69. Other water resistance ratings are also contemplated. The components of the motor unit 106 inside the motor unit housing 110 are water-resistant to the same degree as in a conventional outboard motor. Depending on the specific implementation of the motor unit housing 110 and methods used to produce a generally water-resistant seal, the motor unit housing 110 could be water-resistant to varying degrees. It is contemplated that the housing 110 could receive different treatments to seal the motor unit housing 110 depending on the specific application for which the marine motor assembly 100 is going to be used. In the present implementation, the motor unit housing 110 includes a cowling 112. The cowling 112 is fastened to the rest of the motor unit housing 110 along a diagonally extending parting line 114. A seal 115 (schematically shown in FIGS. 3 and 4) is provided between the cowling 112 and the rest of the motor unit housing 110 along the parting line. A method 400 for testing the water resistance of the motor unit housing 110 will be described in detail below.

The motor unit 106 includes an internal combustion engine 116 disposed in the motor unit housing 110 for powering the assembly 100 and for driving the propeller 102. By removing the cowling 112, the engine 116 can be accessed, as shown in FIGS. 3 to 7. In the present implementation, the internal combustion engine 116 is a three-cylinder, two-stroke, gasoline-powered, direct injected internal combustion engine. It is contemplated that the internal combustion engine 116 could be a four-stroke internal combustion engine. It is contemplated that the engine 116 could have more or less than three cylinders. In some implementations, the internal combustion engine 116 could use a fuel other than gasoline, such as diesel. It is contemplated that the motor unit 106 could include an electric motor (and other associated components) in other implementations, and thus the present technology is not intended to be limited to motor units 106 having an internal combustion engine.

Figure 8:
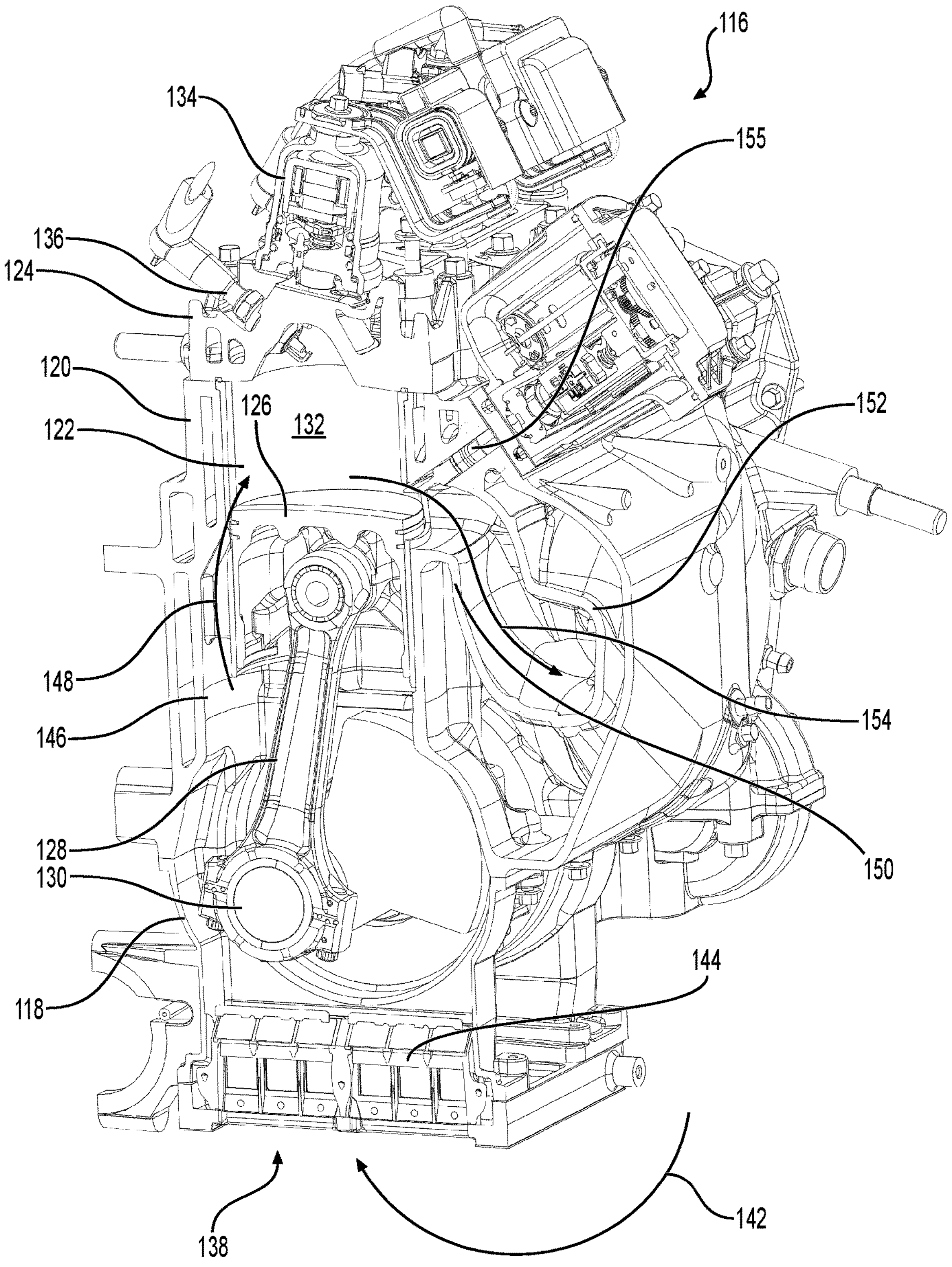
FIG. 8 is a perspective view, taken from a rear, right side of a vertical cross-section of an engine, an exhaust system and other components of the marine motor assembly of FIG. 3, the vertical cross-section being taken laterally through a center of a middle cylinder of the engine.

With reference to FIG. 8, the engine 116 includes a crankcase 118. A cylinder block 120 defining three cylinders 122 (one of which is shown) is disposed above the crankcase 118. A cylinder head 124 is disposed on top of the cylinder block 120. Each cylinder 122 has a piston 126 reciprocally received inside of it. Each piston 126 is connected by a corresponding connecting rod 128 to a crankshaft 130. The crankshaft 130 rotates in the crankcase 118. For each cylinder 122, the piston 126, the cylinder 122 and the cylinder head 124 define together a combustion chamber 132. For each combustion chamber 132, a direct fuel injector 134 supported by the cylinder head 124 is provided to inject fuel into the combustion chamber 132, and a spark plug 136 extends into the combustion chamber 132 through the cylinder head 124 to ignite an air-fuel mixture inside the combustion chamber 132.

The engine 116 includes one air intake 138 per cylinder 122. The air intakes 138 are provided at the bottom of the crankcase 118. Air is delivered to the air intakes 138 by an air intake assembly 140 (FIG. 3), described in more detail below, as indicated by arrow 142. The air passes through reed valves 144 provided in the crankcase 118 adjacent the air intakes 138. The reed valves 144 allow air to enter the crankcase 118 but help prevent air from exiting the crankcase 118. For each cylinder 122, a transfer port 146 communicates the crankcase 118 with the corresponding combustion chamber 132 for air to be supplied to the combustion chamber 132 as indicated by arrow 148 (FIG. 8).

Figure 9:
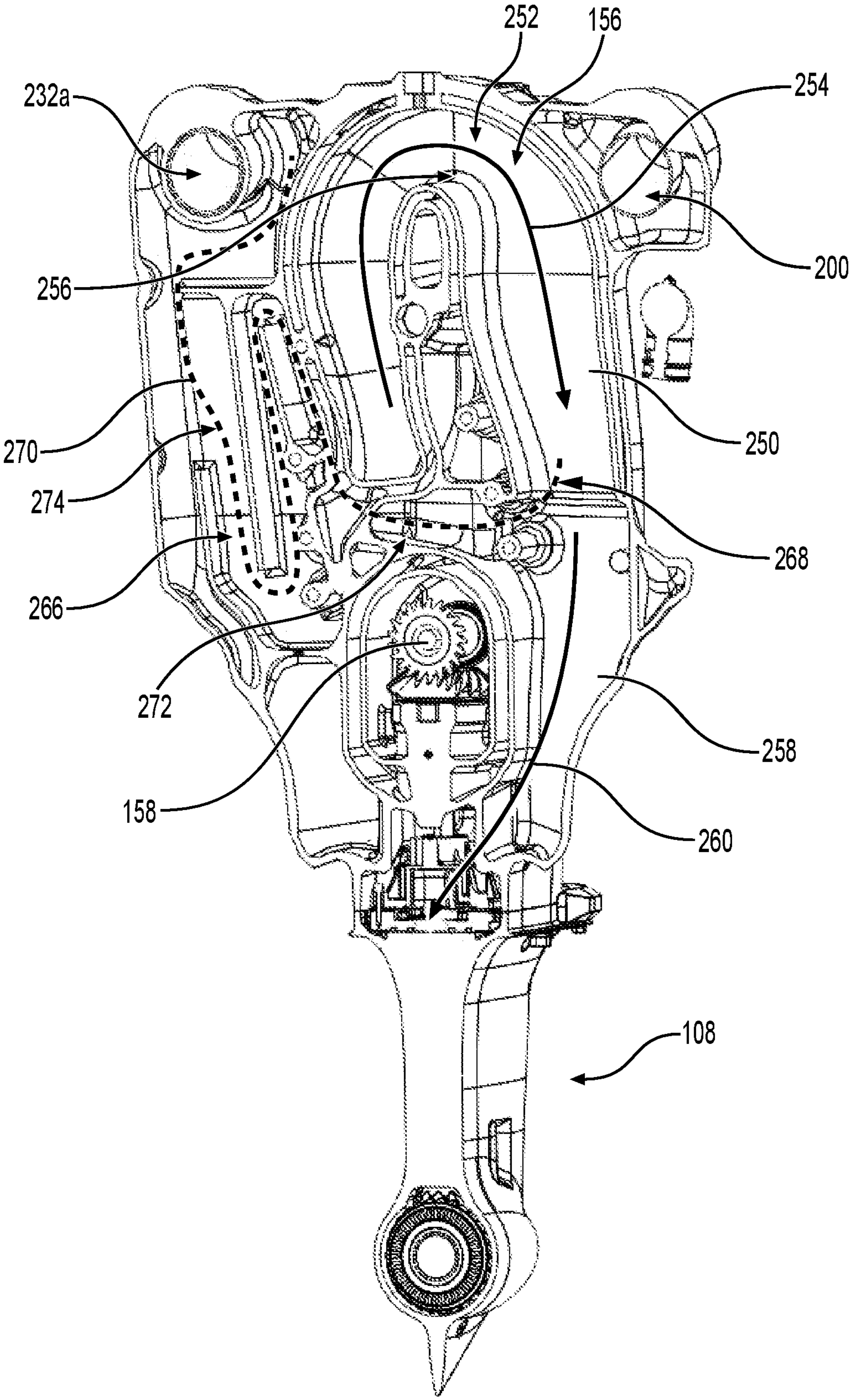
FIG. 9 is a perspective view, taken from a rear, right side of a vertical cross-section of the marine motor assembly of FIG. 3, taken through line 9-9 of FIG. 3.
Figure 10:
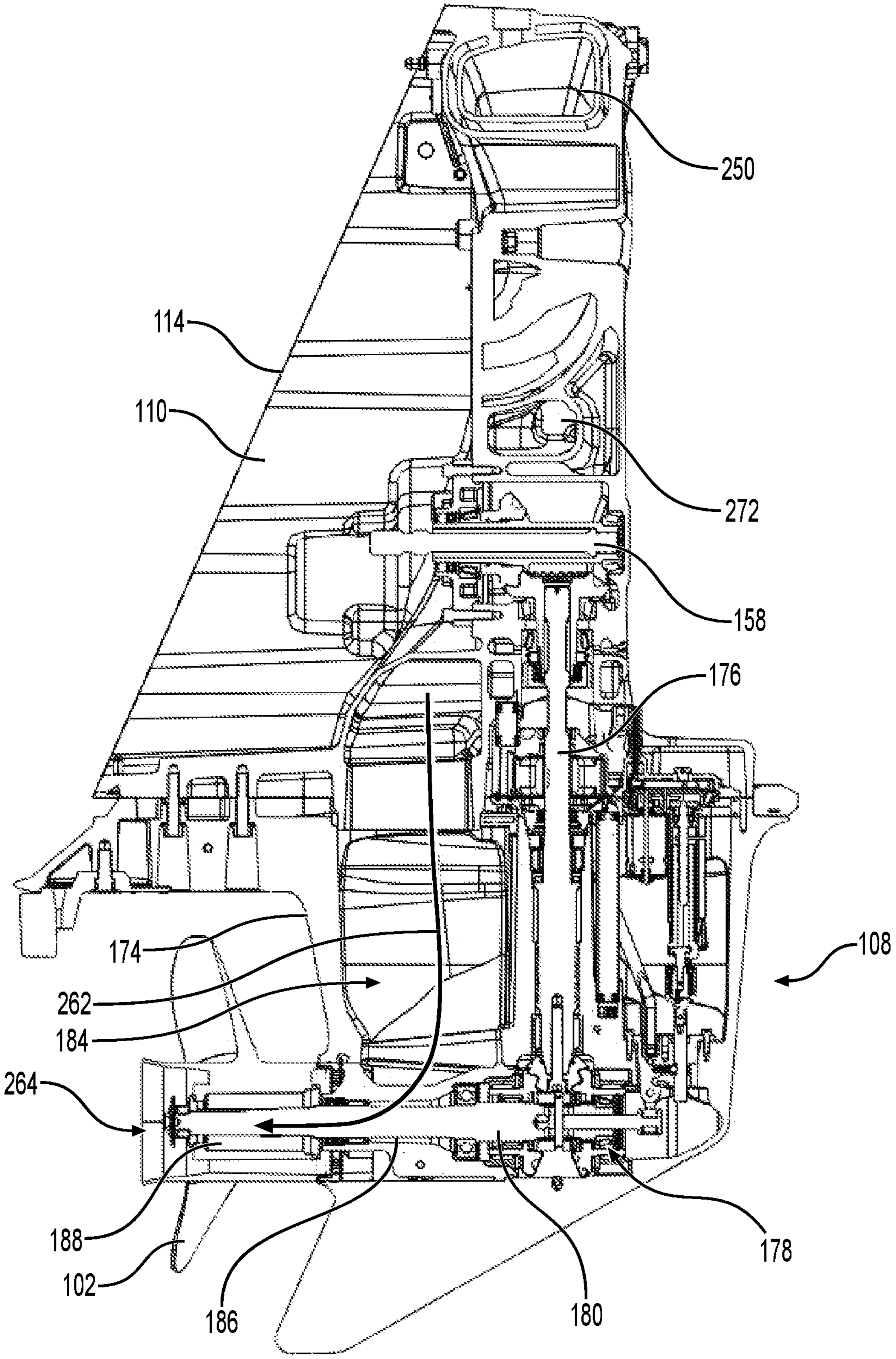
FIG. 10 is a vertical cross-section view of a front portion of the marine motor assembly of FIG. 3, with the engine and some associated components having been removed, the vertical cross-section being taken longitudinally along a lateral center of the marine motor assembly.
Figure 11:
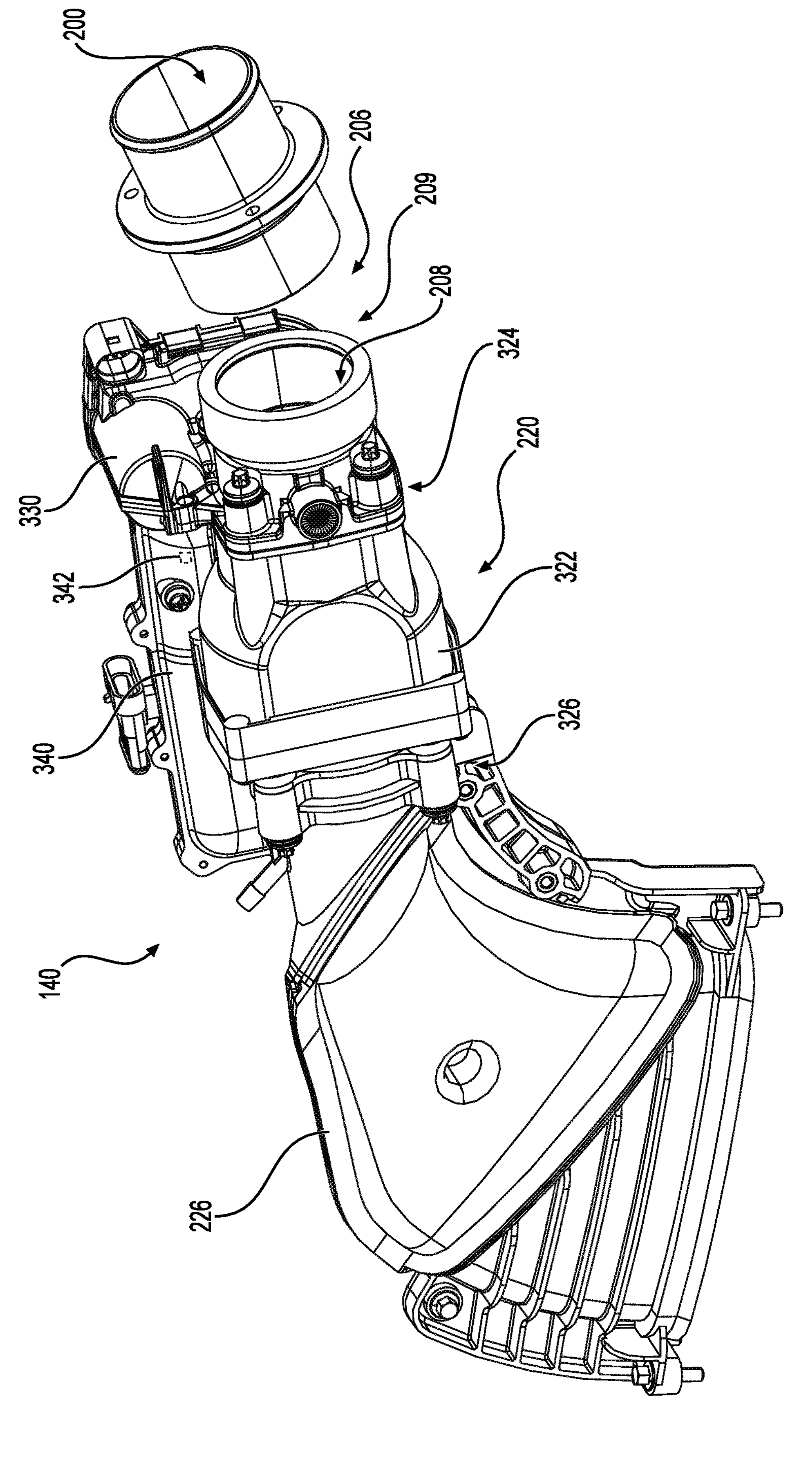
FIG. 11 is a perspective view, taken from a front, right side of an air intake opening, an air intake valve unit and an air intake plenum of the marine motor assembly of FIG. 3.
Figure 12:
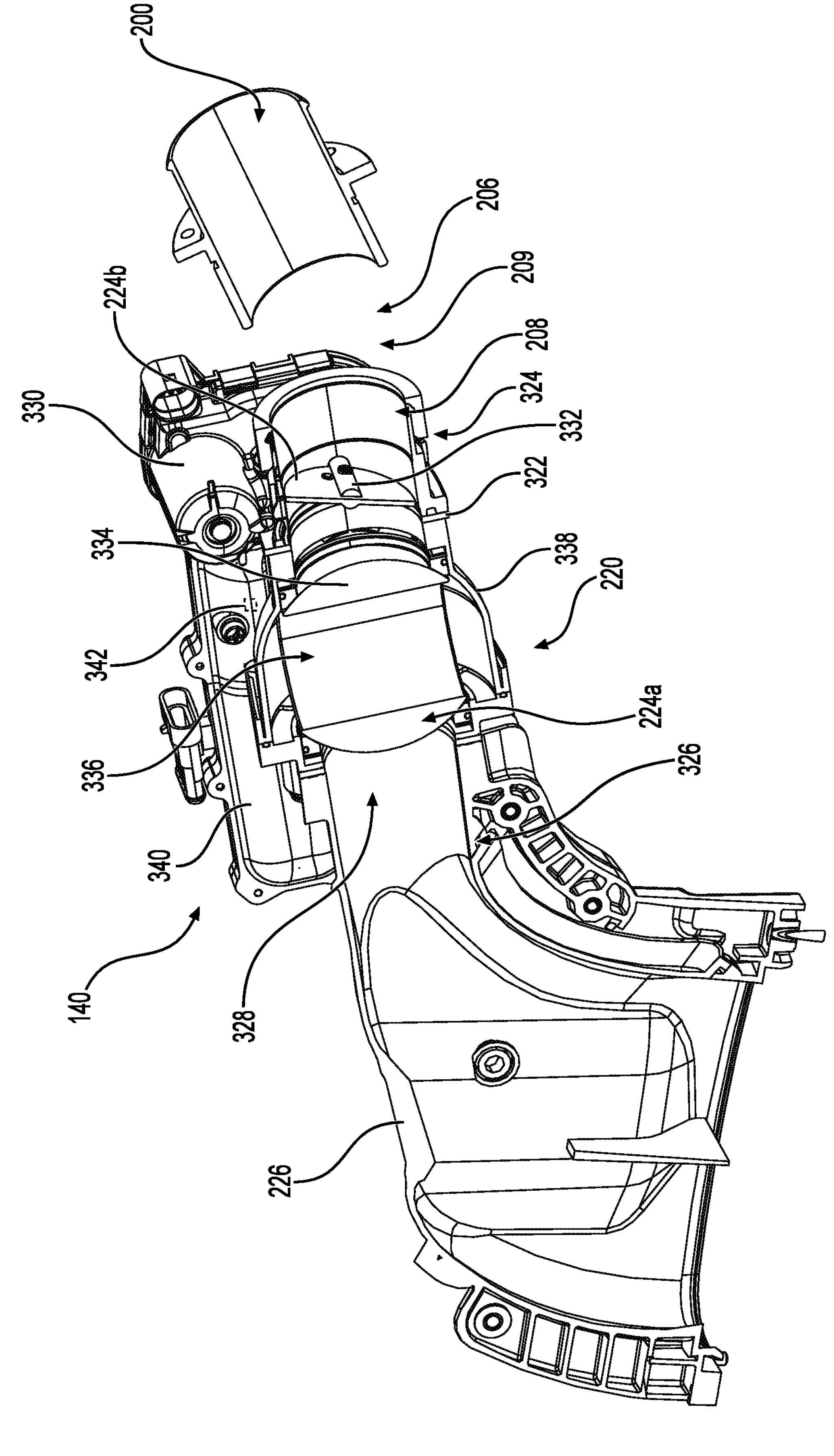
FIG. 12 is a perspective view, taken from a front, right side of a vertical cross-section of the air intake opening, air intake valve unit and the air intake plenum of FIG. 11, the cross-section being taken longitudinally.
Figure 13:
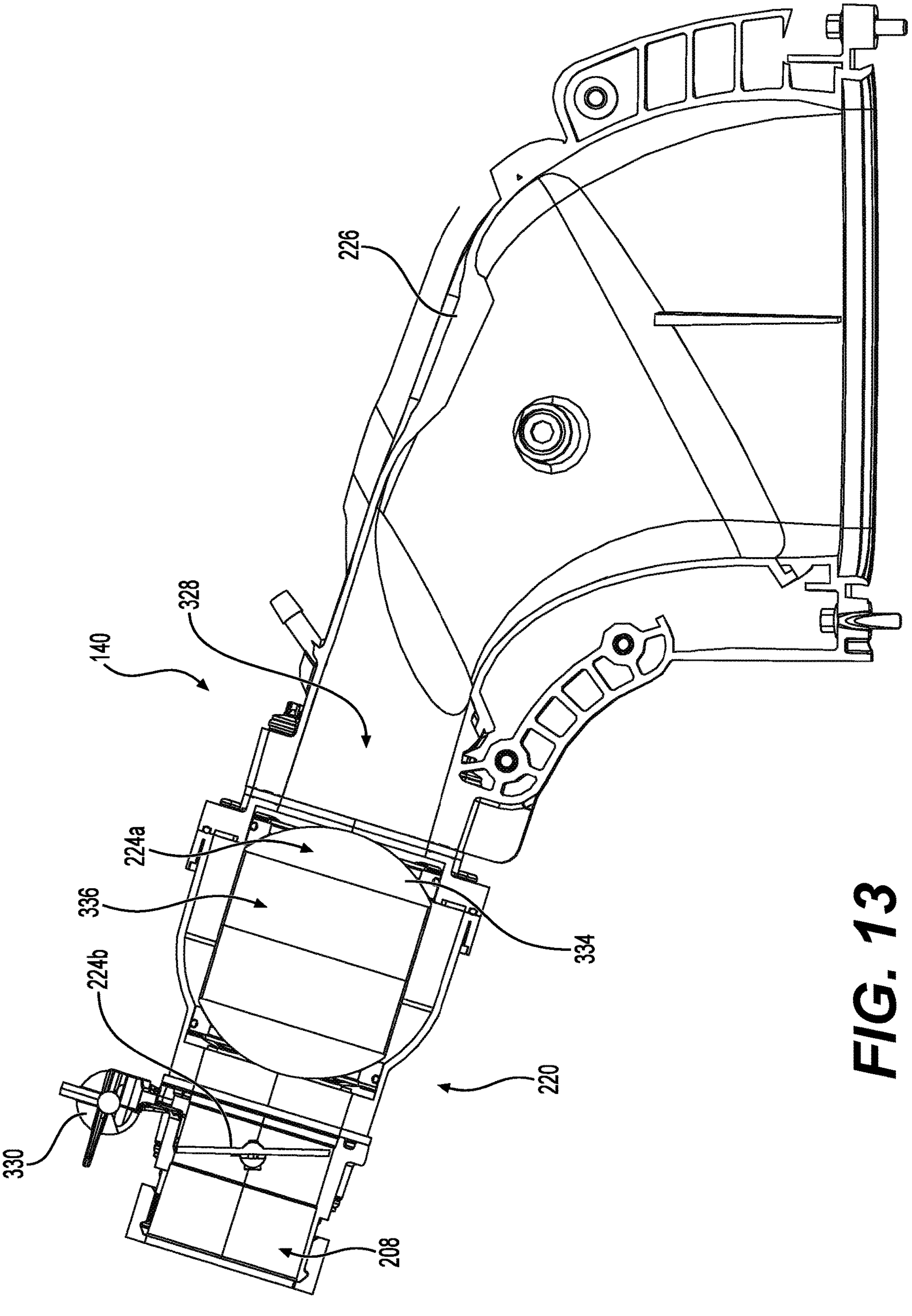
FIG. 13 is a vertical and longitudinal cross-section taken along a lateral center of the air intake valve unit and the air intake plenum of FIG. 11, with a throttle valve and a sealing valve of the air intake valve unit both being closed.

Each combustion chamber 132 has a corresponding exhaust port 150. Exhaust gases flow from the combustion chambers 132, through the exhaust ports 150, into an exhaust manifold 152 as indicated by arrow 154. Each exhaust port 150 has a corresponding reciprocating exhaust valve 155 that varies the effective cross-sectional area and timing of its exhaust port 150. From the exhaust manifold 152, the exhaust gases are routed out of the marine motor assembly 100 via the other portions of an exhaust system 156 (some of which are shown in FIGS. 9 and 10), described in more detail below.

Figure 2:
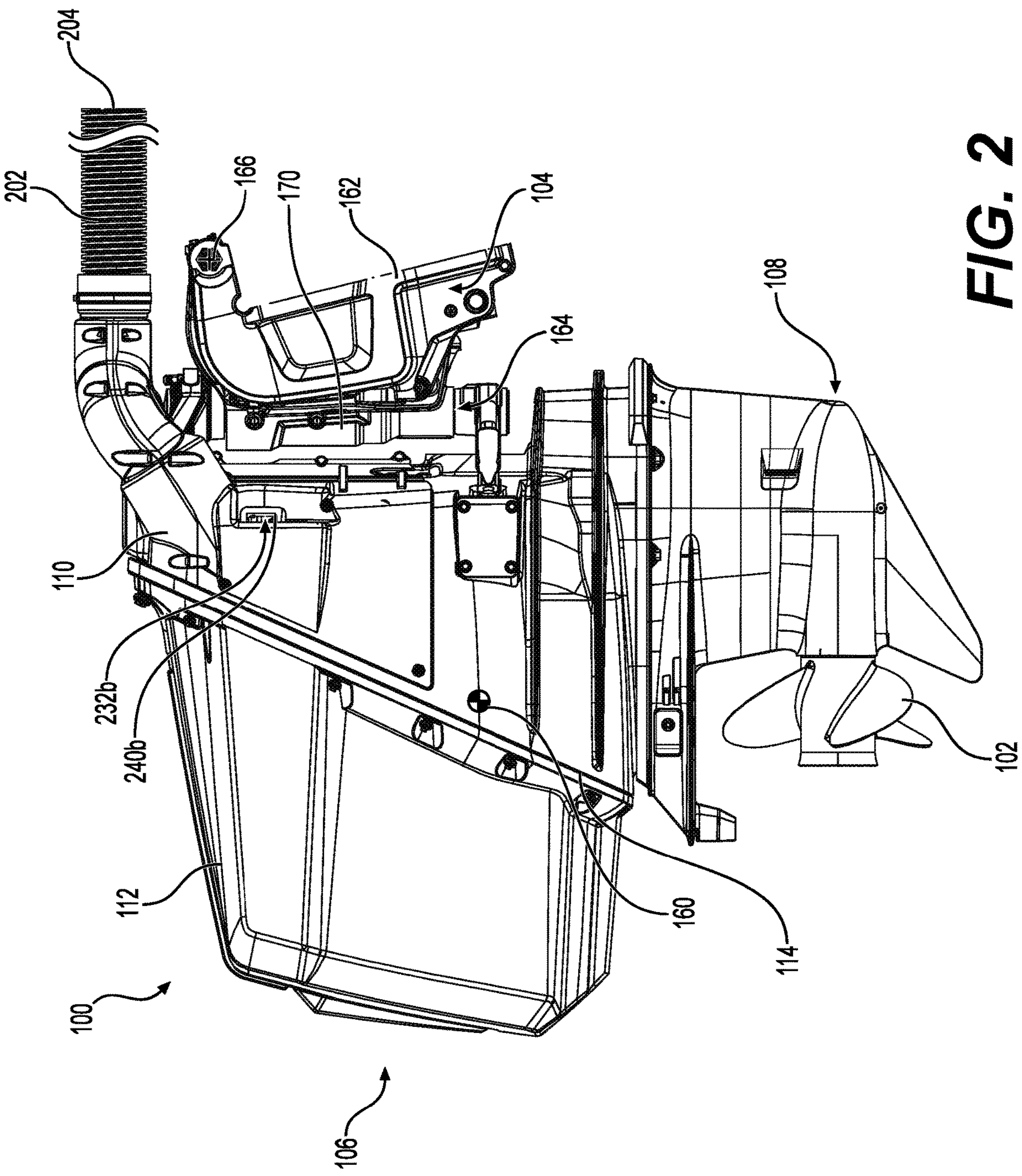
FIG. 2 is a right side elevation view of the marine motor assembly of the watercraft of FIG. 1.

The reciprocation of the pistons 126 causes the crankshaft 130 to rotate. The crankshaft 130 drives an output shaft 158 (FIGS. 9 and 10) which drives the propeller 102, as is described in more detail below. With reference to FIG. 2, a center of mass 160 of the engine 116 is disposed vertically in a lower half of the motor unit housing 110, and longitudinally about halfway along a length of the crankshaft 130, although the exact position of the center of mass 160 depends on the details of a particular implementation of the engine 116.

Returning to FIGS. 2 to 6, the transom bracket 104 includes a watercraft portion 162 which is adapted for fastening to the watercraft body 12. The bracket 104 also includes a motor portion 164, pivotally connected to the watercraft portion 162, and which is fastened to the motor unit housing 110. The motor portion 164 is pivotable with respect to the watercraft portion 162 about a tilt-trim axis 166. The transom bracket 104 thus defines the tilt-trim axis 166 of the marine motor assembly 100, about which the assembly 100 can be trimmed or tilted relative to the watercraft body 12. The motor portion 164 of the transom bracket 104 includes a tilt/trim actuator 168 (FIG. 5) for tilting or trimming the assembly 100 relative to watercraft body 12. In one implementation, the tilt/trim actuator 168 is a linear hydraulic actuator adapted for pushing the motor portion 164 away from the watercraft portion 162, but other types of tilt/trim actuators 168 are contemplated, such as that described in United States Patent Application Publication No. 2019/0233073 A1, published on Aug. 1, 2019 and entitled "Stern and Swivel Bracket Assembly For Mounting A Drive Unit to a Watercraft", U.S. Pat. No. 7,736,206 B1, issued on Jun. 15, 2010 and entitled "Integrated Tilt trim and Steering Subsystem For Marine Outboard Engines", and U.S. Pat. No. 9,499,247 B1, issued on Nov. 22, 2016 and entitled "Marine Outboard Engine Having A Tilt trim And Steering Bracket Assembly", all of these references being incorporated herein by reference in their entirety. The motor portion 164 includes a steering actuator 170 configured for steering the motor unit 106 and the lower unit 108 relative to the transom bracket 104 about a steering axis 172 (FIG. 6). In the present implementation, the steering actuator 170 is a rotary hydraulic actuator, but other types of steering actuators 170 are contemplated.

As can be seen in FIG. 2, the center of gravity 160 of the engine 116 is disposed below the tilt-trim axis 166, when the assembly 100 is in a trim range. As the assembly 100 is designed to be disposed below the deck 18, the engine 116 and the transom bracket 104 partially vertically overlap, rather than the engine 116 being disposed well above the bracket 104 as would be the case in a conventional outboard motor assembly meant to extend higher relative to the watercraft body 12. In the present implementation, the center of gravity 160 is vertically between a top end of the transom bracket 104 and a bottom end of the transom bracket 104.

Turning now to FIG. 10, the lower unit 108 includes a lower unit housing 174, which is fastened to the motor unit housing 110. The lower unit 108 also includes a driveshaft 176, a transmission 178, a propeller shaft 180 and the propeller 102. The driveshaft 176 is driven by the output shaft 158 via bevel gears 182. The driveshaft 176 drives the transmission 178. The transmission 178 selectively drives the propeller shaft 180 to which the propeller 102 is connected. The assembly 100 is said to be in the trim range when the propeller shaft 180 is less than fifteen degrees from horizontal. In other implementations, this angle could be different, such as thirty degrees from horizontal for example.

The lower unit housing 174 defines an exhaust passage 184 for receiving exhaust from the engine 116. The exhaust passage 184 is fluidly connected with channels 186 near the propeller shaft 180. The channels 186 fluidly connect to passages 188 in the propeller 102 which allow exhaust gas to leave the marine motor assembly 100 under water.

Figure 7:
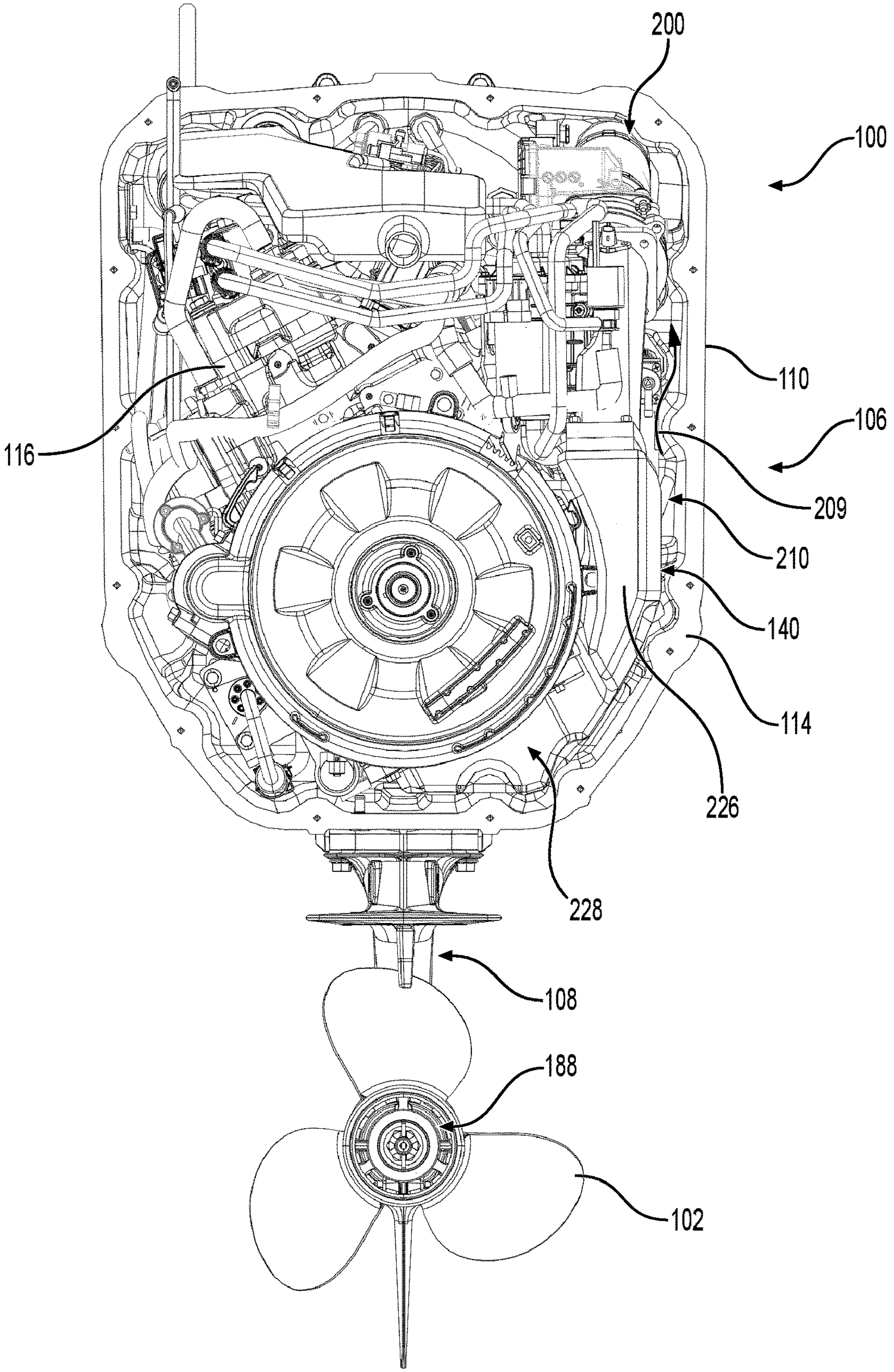
FIG. 7 is a rear elevation view of the marine motor assembly of FIG. 3.

With additional reference to FIGS. 2, 3, 7, 11 and 12, the air intake assembly 140 will now be described in more detail. As mentioned above, the air intake assembly 140 is disposed in the motor unit housing 110. As best seen in FIG. 7, the air intake assembly 140 extends generally along the right side of the motor unit housing 110 and is disposed mainly between the engine 116 and the right side of the motor unit housing 110 and partially below the engine 116. In some implementations, all or part of the air intake assembly 140 could extend along the left, front, rear, top or other sides of the motor unit housing 110, depending on the arrangement of the engine 116 and more specifically the arrangement of the engine air intakes 138. It is also contemplated that all or part of the air intake assembly 140 could extend above the engine 116, depending on the particular implementation of the engine 116.

Figure 3:
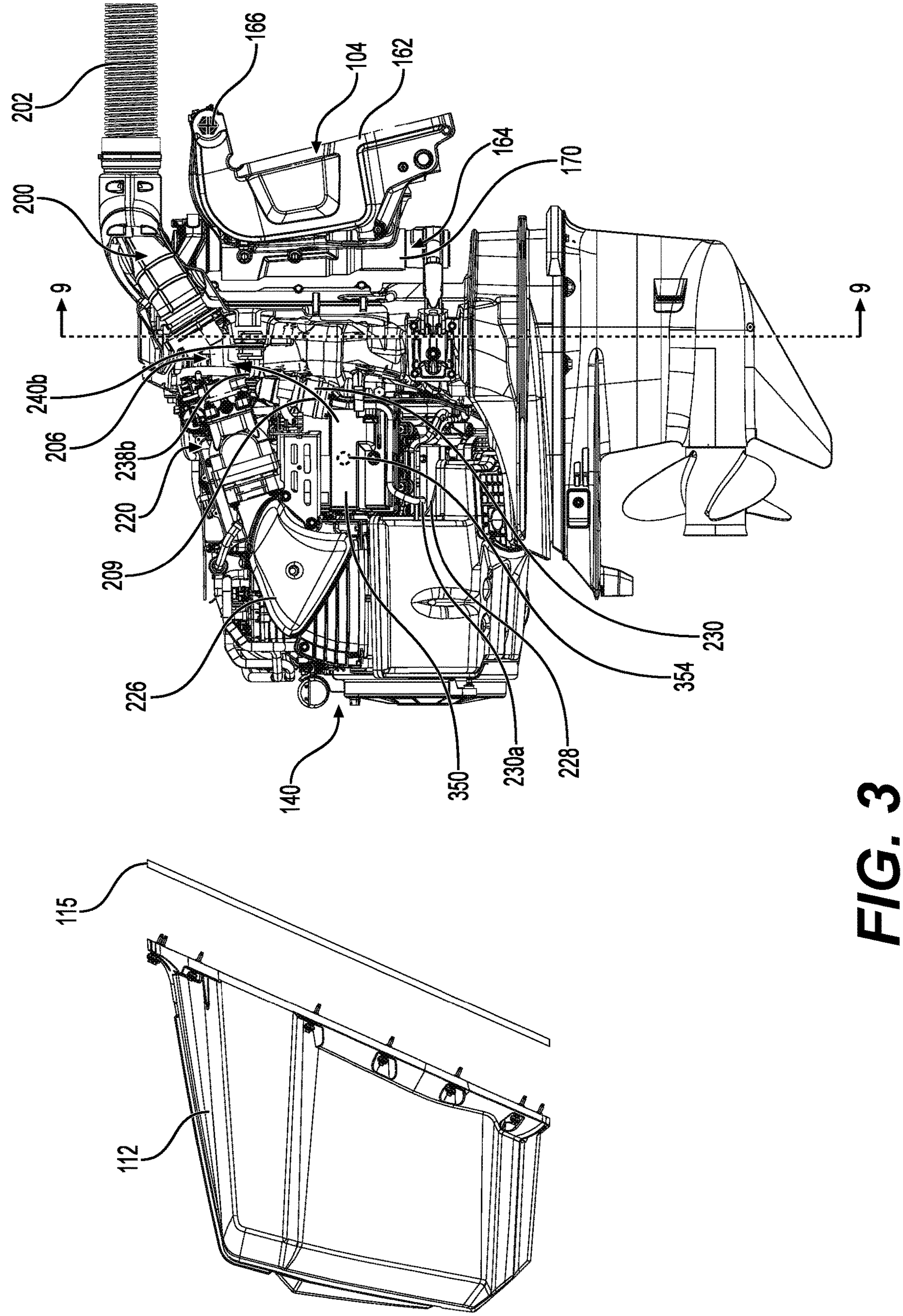
FIG. 3 is a right side elevation view of the marine motor assembly of FIG. 2, with a motor unit housing of the marine motor assembly having been removed.
Figure 4:
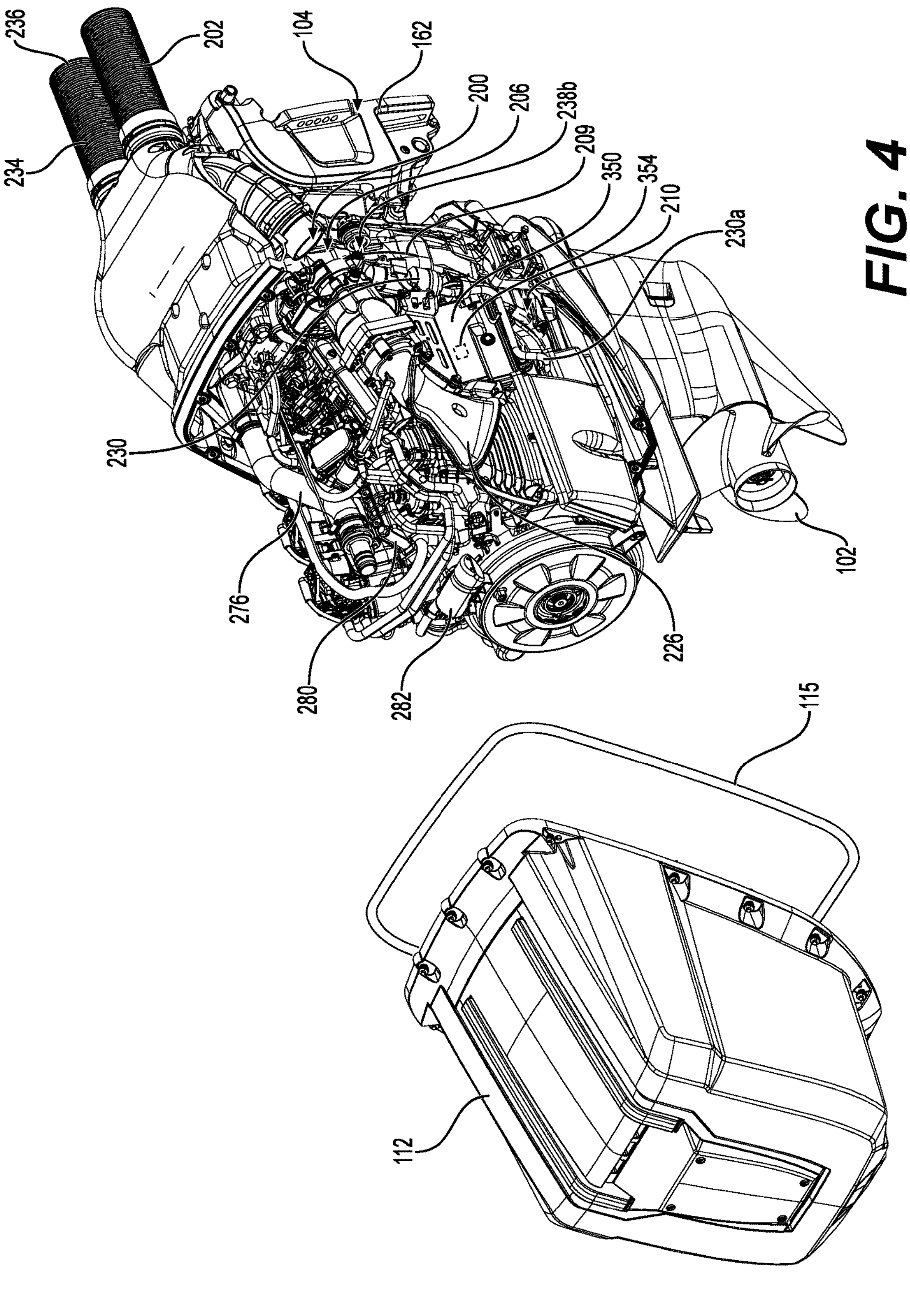
FIG. 4 is a perspective view, taken from a top, rear, right side of the marine motor assembly of FIG. 3.

The motor unit housing 110 defines an air intake opening 200 in a top, front, right side thereof. The air intake opening 200 fluidly communicates air exterior of the motor unit housing 110 to the air intake assembly 140, and more particularly to three outlets (not shown) fluidly connected to the three air intakes 138 of the engine 116. The air intake opening 200 is fluidly connected to an external conduit 202 (FIGS. 2 to 4). The external conduit 202 includes an inlet 204 (FIG. 2) located onboard the watercraft 10. The external conduit 202 is supported by the watercraft body 12. The external conduit 202 delivers air from above the water line to the air intake assembly 140. A gap 206 is defined between the air intake opening 200 and an air inlet 208 (FIG. 11) of the air intake assembly 140. Air present in an under-housing volume 210 of the motor unit housing 110 fluidly communicates with the air intake opening 200 and the air inlet 208 of the air intake assembly 140 such that the air supplied through the external conduit 202 mixes with air present in the under-housing volume 210 before entering the air inlet 208 of the air intake assembly 140, as shown by arrow 209. In some implementations, the gap 206 permits that about 10 to 15% of the air supplied through the external conduit 202 mixes with the air present in the under-housing volume 210 before entering the air inlet 208. In some implementations, this mixing of the air of supplied through the external conduit 202 with the air contained in the under-housing volume 210 reduces the noise of the engine 116 and helps preventing moisture from accumulating in the under-housing volume 210. It is contemplated that, in other implementations, a greater or lesser portion of the air supplied through the external conduit 202 mixes with the air present in the under-housing volume 210.

In other implementations, the air intake assembly 140 forms a conduit between an exterior of the motor unit housing 110 and the engine 116 for providing air for combustion. In other words, the gap 206 described above is absent and the air intake assembly 140 is fluidly connected directly to the air intake opening 200. The air intake assembly 140 is sealed such that surrounding fluids in the under-housing volume 210, such as any air and water present in the motor unit housing 110, are impeded from entering the air intake assembly 140 and thereby will not enter the engine 116 via the air intake assembly 140. Instead, the air intake assembly 140 delivers air from outside the motor unit housing 110 to the engine 116 directly, delivering the air needed for combustion in the engine 116.

Additional components of the air intake assembly 140 will now be described in more detail. An air intake valve unit 220 disposed on a right side of the engine 116 has an upstream end fluidly connected to the under-housing volume 210 and the air intake opening 200 (as seen from arrow 209). The air intake valve unit 220 has a sealing valve **224*a* and a throttle valve 224*b*. The air intake valve unit 220 will be described in more detail below. A plenum 226 is connected to a downstream end of the air intake valve unit 220. As can be seen in FIG. 3, the plenum 226 diverges as it extends rearward and downward from the air intake valve unit 220. As can be seen in FIG. 7, the lower end of the plenum 226 is connected to an air intake manifold 228. The air intake manifold 228 connects to the bottom of the crankcase 118 to supply air to the air intakes 138 of the engine 116. It is contemplated that some or all of the components of the air intake assembly 140 could be disposed on any other side or sides of the engine 116**.

As can be seen in FIGS. 3 and 4, an air pump 230 is disposed inside the motor unit housing 110 and fluidly communicates with the under-housing volume 210 of the motor unit housing 110. The air pump 230 is powered by a battery (not shown) provided on the boat 10. The air pump 230 is connected to a right side of the engine 116 below the air intake valve unit 220 and in front of the plenum 226. It is contemplated that the air pump 230 could be provided elsewhere inside the motor unit housing 110. The air pump 230 selectively supplies air from the under-housing volume 210 to the air intake manifold 228 as will be described in more detail below. It is contemplated that in other implementations, the air pump 230 could fluidly communicate to an exterior of the motor unit housing 110, and selectively supply air from the under-housing volume 210 to the exterior of the motor unit housing 110 through a wall thereof.

Figure 5:
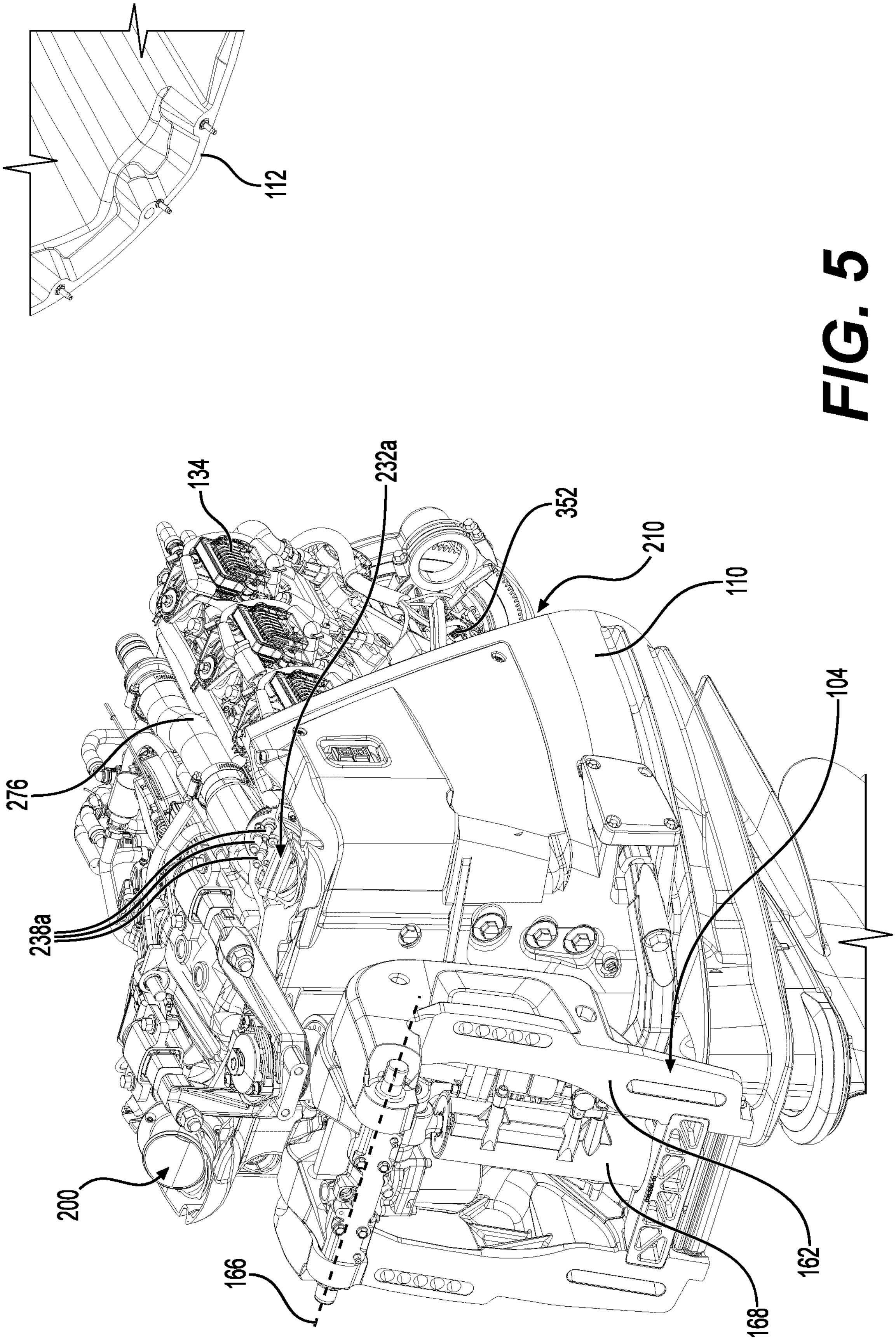
FIG. 5 is a perspective view, taken from a top, front, left side of the marine motor assembly of FIG. 2, with a portion of the motor unit housing of the marine motor assembly having been removed.
Figure 6:
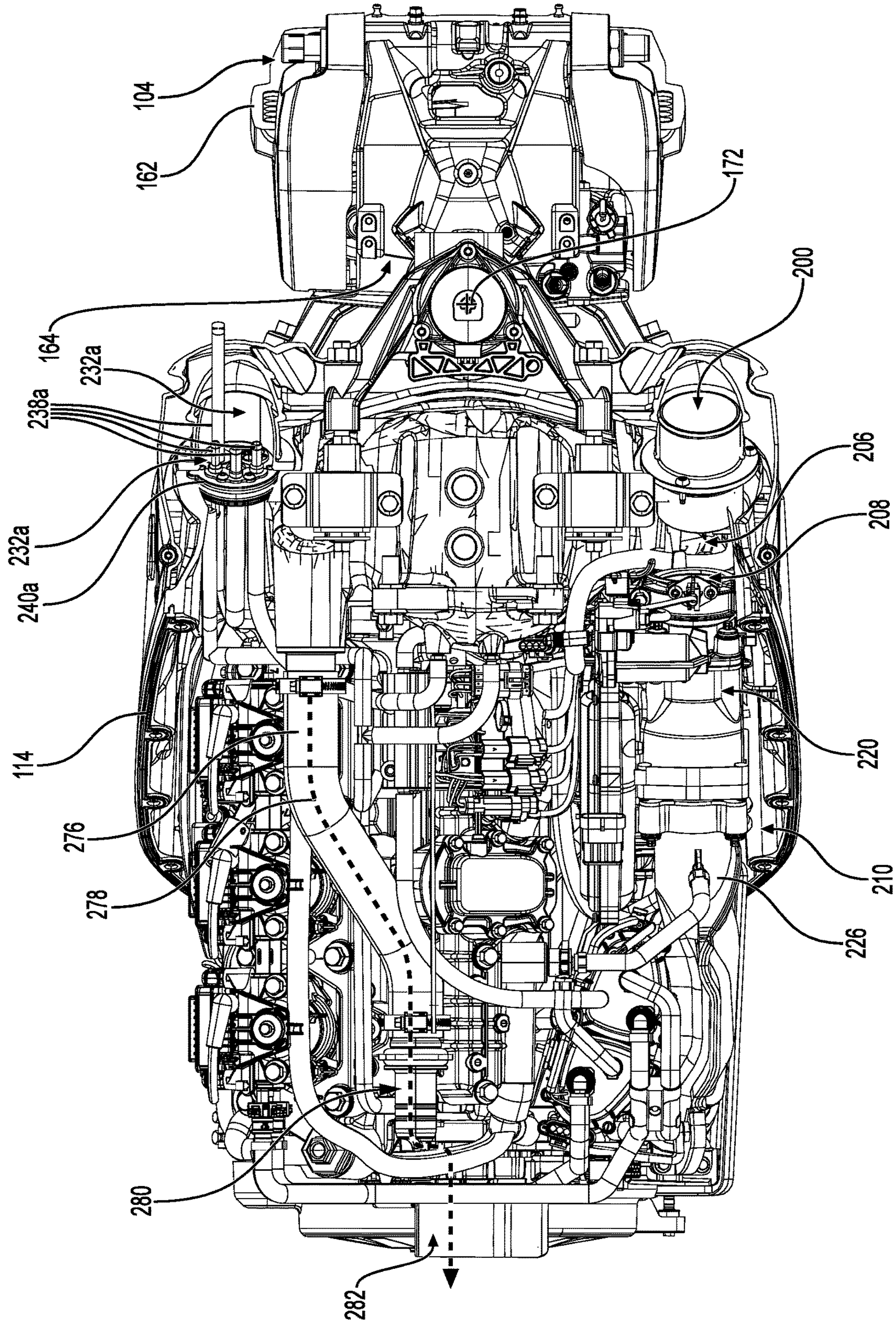
FIG. 6 is a top plan view of the marine motor assembly of FIG. 5.

As can be seen in FIG. 5, the motor unit housing 110 defines an aperture 232*a* on a top, front, left side thereof, that fluidly communicates with air exterior to the motor unit housing 110. The aperture 232*a* is fluidly connected to an external conduit 234 (FIG. 4). The external conduit 234 includes an inlet 236. The external conduit 234 is supported by the watercraft body 12. The external conduit 234 is used for the routing of lines 238*a* that extend from components disposed inside the motor unit housing 110, then pass through the aperture 232*a* and the external conduit 234 to connect to components provided on the watercraft 10. The lines 238*a* include, but are not limited to, battery cables to connect components inside the motor unit housing 110 to one or more batteries provided on the watercraft 10, communication lines for exchanging signals between components inside the motor unit housing 110 and components provided on the watercraft 10 such as display gauges, a throttle input, and a transmission input, and a fuel line for supplying fuel from a fuel tank on the watercraft 10 to the fuel injectors 134. It is also contemplated that the lines 238*a* can include an oil supply hose for connecting an oil pump inside the motor unit housing 110 with an external oil tank located onboard the watercraft 10. A grommet 240*a* (FIG. 6) is disposed in the aperture 232*a* between the lines 238*a* and the motor unit housing 110 for sealing the motor unit housing 110 to a degree sufficient for water resistance while permitting pass-through of the lines 238*a*. Referring to FIGS. 2 to 4, the motor unit housing 110 further defines an aperture 232*b* on a front, right side thereof in which a pass-through connector 240*b* is disposed. The pass-through connector 240*b* closes the aperture 232*b* and allows connection of lines 238*b* that extend from components disposed inside the motor unit housing 110, then through the pass-through connector 240*b* and on to connect to components provided on the motor portion 164 of the transom bracket 104. The lines 238*b* include, but are not limited to, a tilt-trim motor line, a tilt-trim position sensor line, a power steering motor line, at least one power steering pressure sensor line, and a steering position sensor line. In the present implementations, the pass-through connector 240*b* is a 19-pin pass-through connector, but other types of pass-through connectors are contemplated.

Turning now to FIGS. 8 to 10, the exhaust system 156 will be described in more detail. As previously mentioned, each combustion chamber 132 has a corresponding exhaust port 150. Exhaust gases flow from the combustion chambers 132, through the exhaust ports 150, into the exhaust manifold 152 as indicated by arrow 154. From the exhaust manifold 152, the exhaust gases flow forward into an exhaust pipe (not shown) and then into an exhaust pipe 250 located at a front of the motor unit housing 110, in front of the engine 116. As can be seen in FIG. 9, the exhaust pipe 250 extends upward, then curves and extends downward, thus forming a gooseneck having an apex 252. Exhaust gas flows in the exhaust pipe 250 in the direction indicated by arrow 254. The inner portion 256 of the apex 252 is vertically higher than the top of the combustion chambers 132 when the marine motor assembly 100 is in the trim range to help prevent intrusion of water into the combustion chambers 132 from the exhaust system 156. From the exhaust pipe 250, the exhaust gas flows downward and under the output shaft 158 via an exhaust passage 258, as indicated by arrow 260. From the exhaust pipe 258, the exhaust gases enter the lower unit housing 174. With reference to FIG. 10, as indicated by arrow 262, the exhaust gases flow through the exhaust passage 184, then through the channels 186, and finally through the passages 188 in the propeller 102. The ends of the passages 188 define the exhaust gas outlets 264 of the exhaust system 156.

During operation of the marine motor assembly 100, such as when the engine is idling or operating at trolling speeds, the exhaust gas pressure may become too low to keep the water out of the lower portion of the exhaust system 156. Under these conditions, this can result in water entering the passages 188, the channels 186, the exhaust passage 184, and rising into the exhaust passage 258 up to the same level as the water outside of the marine motor assembly 100 (i.e. up to the waterline). As this water blocks the exhaust outlets 264, the exhaust system 156 includes an idle relief passage 266 (FIG. 9) to allow the exhaust gases to flow out of the marine motor assembly 100 to the atmosphere. With reference to FIG. 9, the idle relief passage 266 has an idle relief passage inlet 268 communicating with the exhaust passage 258. As indicated by the dotted-line arrow 270, from the idle relief passage inlet 268 the exhaust gases flow left trough a passage 272, then through a tortuous passage 274. With reference to FIGS. 5 to 7, from a top of the tortuous passage 274, the exhaust gases flow rearward through an idle relief hose 276 disposed on top of the engine 116 as indicated by dotted-line arrow 278. From the idle relief hose 276, the exhaust gases flow through a connector 280 that extends connects to an idle relief muffler (not shown) located at the top, rear portion of the cowling 112. The outlet of the idle relief muffler is an idle relief passage outlet 282 (shown schematically in FIG. 6) of the idle relief passage 266. The idle relief passage outlet 282 is near a top of the motor unit housing 110 so as to be above the waterline during typical operation of the marine motor assembly 100. It is contemplated that the idle relief passage outlet 282 could be disposed on the front, top or sides of the motor unit housing 110. It is contemplated that the idle relief passage outlet 282 could be located at other positions that are vertically higher than the exhaust outlets 264 at least when the marine motor assembly 100 is in the trim range. It is contemplated that the idle relief muffler 276 could be omitted.

The air intake assembly 140, the under-housing volume 210 of the motor unit housing 110, the crankcase 118, the transfer ports 146, the combustion chambers 132, and the exhaust system 156 together define a gas flow pathway. The gas flow pathway is the path through which gas (air or exhaust gas depending on the location) flows from the point it enters the motor unit housing 110 to be supplied to the engine 116 to the point at which it is exhausted from the marine motor assembly 100. The air intake opening 200 defines the upstream end of the gas flow pathway. The exhaust outlets 264, 282 define the downstream ends of the gas flow pathway. In implementations where the engine 116 is a four-stroke engine, as the engine 116 has no transfer ports, and since the air does not flow through the crankcase before reaching the combustion chambers, the gas flow pathway would not include the crankcase and transfer ports. In implementations where the air intake opening 200 is connected directly to the air intake assembly 140, the gas flow pathway would not include the under-housing volume 210.

As described above, the marine motor assembly 100 is provided with various features to make the motor unit housing 110 water-resistant and to help prevent entry of water into the combustion chambers 132 of the engine 116. Although these are effective for most conditions, there could be some rare conditions, especially when the engine 116 is stopped, where additional protection against water intrusion may be useful. Examples of such possible conditions could include a lot of weight being on the boat 10 above the marine motor assembly 100 causing it to sink into water much lower than it typically does, the boat 10 and marine motor assembly 100 being launched in the water at a steep angle and/or at higher than normal speed, and rough water conditions wherein large waves impact the motor unit housing 110.

To provide additional protection against water intrusion into the combustion chamber 132 from the exhaust system 156, the marine motor assembly 100 is provided with the sealing valve 224*a*. When the sealing valve 224*a* is open, gas can flow through the gas flow pathway. However, when the sealing valve 224*a* is closed, flow of gas through the sealing valve 224*a* is prevented, and the sealing valve 224*a* thus hermetically seals the portion of the gas flow pathway downstream of the sealing valve 224*a* from the portion of the gas flow pathway upstream of the sealing valve 224*a*. This is in contrast to a conventional throttle valve, such as the throttle valve 224*b* illustrated herein, which is used to control the amount of air that flows to the engine while it is operating, and which restricts the flow of air when closed but does not provide a hermetic seal. As a result, when the sealing valve 224*a* is closed, should water rise into the exhaust system 156 rise above the idle relief passage inlet 268, the gas present between the sealing valve 224*a* and the water having entered the exhaust system 156 is trapped and has nowhere to go. As such, this volume of air acts like an air spring pushing against the water, thus resisting increases in water level in the exhaust system 156. In implementations where no idle relief passage 266 is provided, the entire volume of gas between the sealing valve 224*a* and the exhaust outlets 264 could act like an air spring resisting increases in water level in the exhaust system 156.

In other implementations, the sealing valve 224*a* could also combine the function of the throttle valve 224*b*, as described in U.S. patent application Ser. No. 17/164,256 filed Feb. 1, 2021 entitled "Marine Engine Assembly Having A Sealing Valve", which is incorporated by reference herein in its entirety. It is contemplated that in other implementations, only one valve could be provided. It is also contemplated that the sealing valve 224*a* could be in any location along the gas flow pathway. It is contemplated that the sealing valve 224*a* could be provided in the gas flow pathway at positions upstream of the combustion chambers 132, or upstream of the engine 116. It is contemplated that the sealing valve 224*a* could be provided in the gas flow pathway at positions downstream the engine 116.

Turning now to FIGS. 11 to 14, the intake valve unit 220 will be described. The intake valve unit 220 has a valve unit body 322. The valve unit body 322 has an upstream end 324 (corresponding to the air inlet 208) and a downstream end 326. A passage 328 extends between the upstream end 324 and the downstream end 326. The throttle valve 224*b* is of a type commonly referred to as a butterfly valve and is pivotally disposed in the valve unit body 322. A throttle valve actuator 330 is disposed outside of the valve unit body 322. In the present implementation, the throttle valve actuator 330 is an electric motor, but other types of actuators are contemplated. The throttle valve actuator 330 is connected to a shaft 332 pivotally supporting the throttle valve 224*b* in the valve unit body 322 for moving the throttle valve 224*b* between opened and closed positions.

The sealing valve 224*a* is disposed in the valve unit body 322 between the throttle valve 224*b* and the downstream end 326. In the present implementation, the sealing valve 224*a* is a ball valve 224*a*. The ball valve 224*a* has a ball valve body 334 defining a passage 336 therethrough. The ball valve body 334 is pivotally received in a correspondingly shaped seat 338 defined by the valve unit body 322. The ball valve body 334 is operatively connected to a sealing valve actuator 340 disposed outside of the valve unit body 322. In the present implementation, the sealing valve actuator 340 is an electric motor, but other types of actuators are contemplated. The sealing valve actuator 340 pivots the ball valve body 334 between open and closed positions corresponding to open and closed positions of the ball valve 224*a*.

Figure 14:
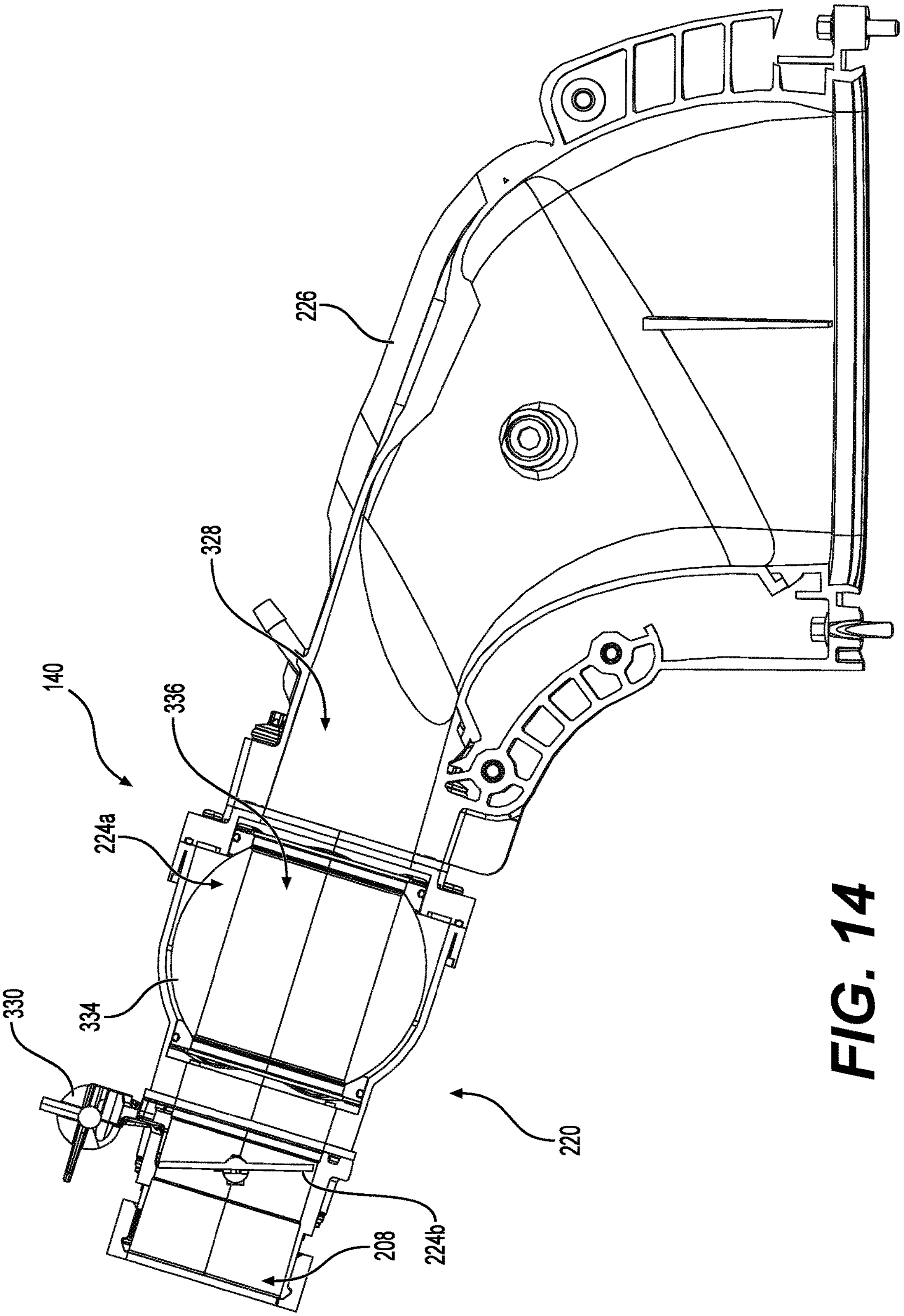
FIG. 14 is the cross-section of FIG. 13, with the throttle valve being closed and the sealing valve being open.

In the open position of the ball valve 224*a*, shown in FIG. 14, the passage 336 of the ball valve body 334 is aligned with the passage 328 defined by the valve unit body 322, and gas can flow through the ball valve 224*a*. In the closed position of the ball valve 224*a*, shown in FIG. 13, the ball valve body 334 is pivoted such that outer surfaces of the ball valve body 334 block the passage 328, thereby preventing flow of gas through the ball valve 224*a* for hermetically sealing the portion of the valve unit body 322 downstream of the ball valve 224*a* from the portion of the valve unit body 322 upstream of the ball valve 224*a*. It is contemplated that a sealing valve of a type other than a ball valve could be used. For example, it is contemplated that a guillotine valve or a butterfly valve could be used as the sealing valve 224*a*. As the intake valve unit 220 has different actuators 330 and 340 used for moving the throttle valve 224*b* and the sealing valve 224*a*, the sealing valve 224*a* can be moved independently of the throttle valve 224*b* and vice versa.

Turning now to FIGS. 3 and 4, components of the marine motor assembly 100 involved in an operation of the sealing valve 224*a* of the air intake valve unit 220 and in an operation of the air pump 230 will be described. An engine management module (EMM) 350, also referred to as an engine control unit, a motor control unit, a propulsion control unit or a control unit, is provided inside the motor unit housing 110. The EMM 350 includes multiple processors and data storage modules. The EMM 350 is connected to and controls the operation of the engine 116, including the starter motor 352 (FIG. 5), the tilt/trim actuator 168, the air pump 230 and the sealing valve actuator 340. The EMM 350 thus acts as a control unit for these components. In order to control these components, the EMM 350 is connected to and receives signals from a sealing valve position sensor 342 (schematically shown in FIGS. 11 and 12) as well as other sensors provided on the engine 116, in the marine motor assembly 100, such as a throttle valve position sensor (not shown), and on the boat 10, such as a shift lever position sensor (not shown).

The sealing valve position sensor 342, as its name suggest, sends a signal to the EMM 350 indicative of the position of the sealing valve 224*a*. It is contemplated that the sealing valve position sensor 342 could be integrated with the sealing valve actuator 340 or could be a dedicated sensor sensing the position of sealing valve 224*a*. It is also contemplated that the sealing valve position sensor 342 could only provide an indication of whether the sealing valve 224*a* is open or closed, without an exact indication of its position. Should there be a discrepancy between the signals sent by the EMM 350 to the sealing valve actuator 340 and the sensed position of the sealing valve 224*a* by the sealing valve position sensor 342, the EMM 350 generates a fault signal that can be indicated to an operator of the watercraft 10 and/or registered in the data storage modules of the EMM 350. For example, should the sealing valve 224*a* fail to close in response to a closing signal from the EMM 350 to the sealing valve actuator 340, the EMM 350 is programmed for generating a corresponding fault signal.

The EMM 350 is also connected to and receives signals from a pressure sensor 354 (schematically shown in FIGS. 3 and 4) disposed inside the motor unit housing 110. The pressure sensor 354 is a barometric pressure sensor fluidly communicating with the under-housing volume 210 for measuring air pressure in the under-housing volume 210.

Figure 15:
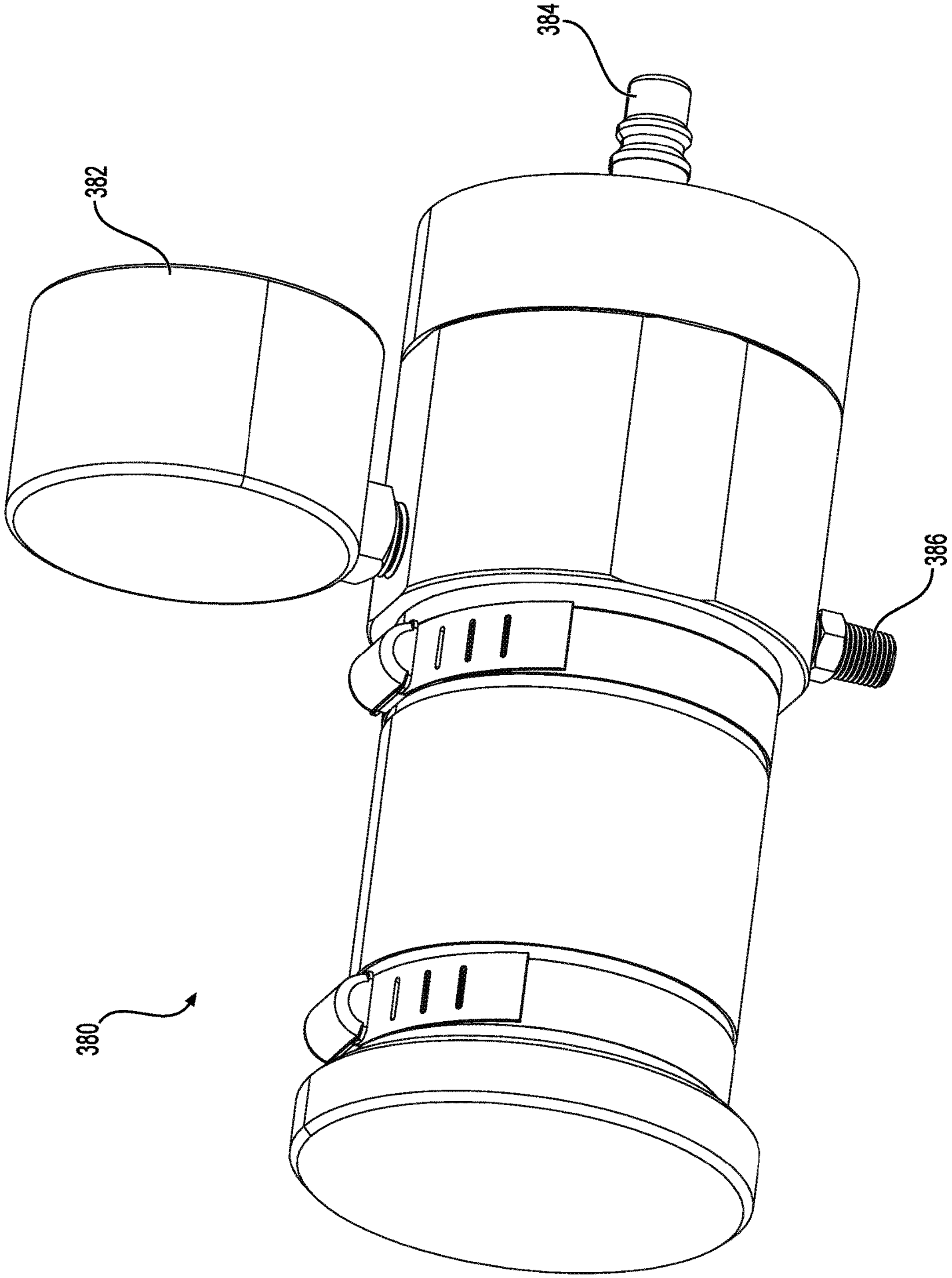
FIG. 15 is a perspective view, taken from a rear, right side of a service plug selectively connected to the marine motor assembly of FIG. 3.
Figure 16:
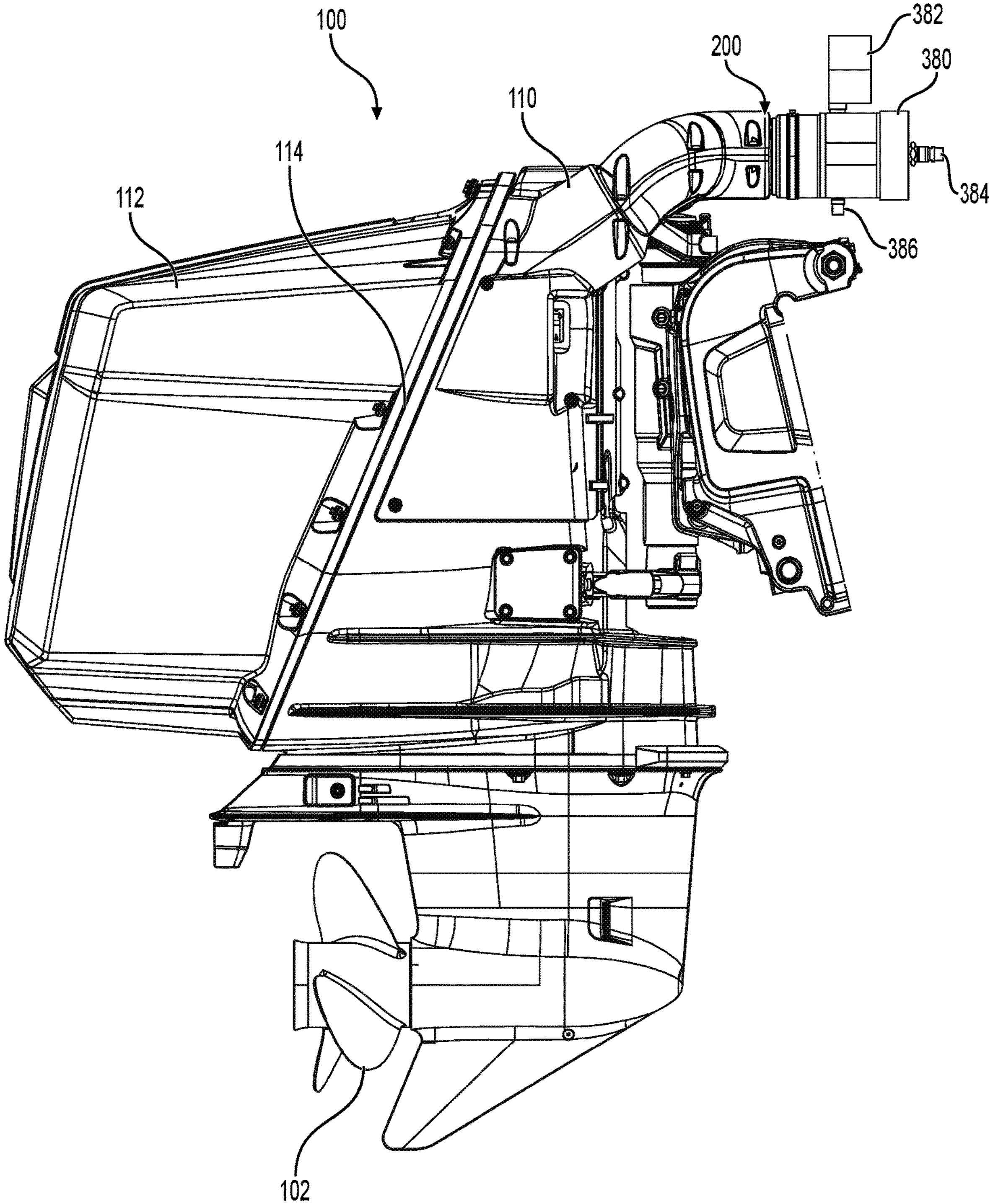
FIG. 16 is a right side elevation view of the marine motor assembly of FIG. 3, with the service plug of FIG. 15 connected to an air intake opening thereof.
Figure 17:
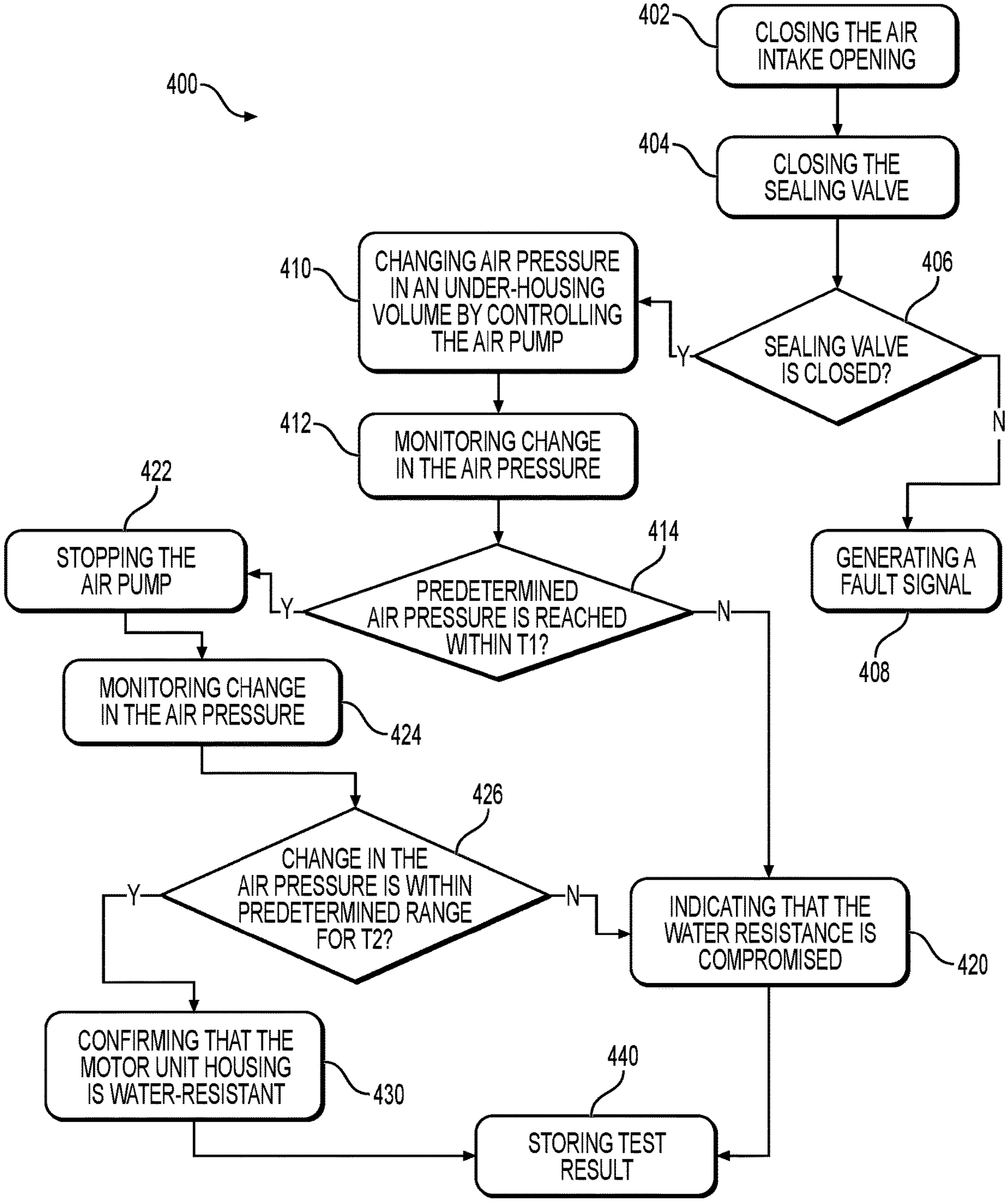
FIG. 17 is a flowchart illustrating a method for testing a water resistance of the motor unit housing of the marine motor assembly of FIG. 3.

Turning now to FIGS. 15 to 17, the method 400 for testing a water resistance of the motor unit housing 110 will be described. The method 400 could be performed, for example, after servicing the engine 116 and reinstallation of at least one of the cowling 112 and the grommet 240*a* to test the water resistance of the motor unit housing 110. The method 400 will be described in detail below, but generally, the method 400 involves changing the air pressure in the under-housing volume 210 and monitoring change in the air pressure for a predetermined amount of time. The method 400 further includes confirming that the motor unit housing 110 is water-resistant in response to determining that the change in air pressure is within a predetermined range. Conversely, the method 400 further includes indicating that the water resistance of the motor unit housing 110 is compromised in response to determining that the change in air pressure is outside the predetermined range.

As will become apparent from the following description, the method 400 could be performed in various ways and with steps in different order and is therefore not limited to the steps and actions about to be described in relation to the marine motor assembly 100 described herein. Alternatives will be provided, and other alternatives not explicitly described herein are also contemplated.

The method 400 begins at step 402. At step 402, the air intake opening 200 is closed. In the present implementation, the step 402 is performed by connecting a service plug 380 (FIGS. 15 and 16) to the motor unit housing 110 for hermetically sealing the air intake opening 200. The service plug 380 includes a pressure gauge 382, a connector 384 for selectively supplying air through the service plug 380, and a blow-off valve 386. The service plug 380 has different purposes. First, the service plug 380 is used to close the air intake opening 200 for enabling the change of air pressure in the under-housing volume 210. Second, the service plug 380 could be used in certain circumstances to selectively supply compressed air from an external source (i.e. an air hose fluidly connected to the connector 384 for supplying compressed air) to the under-housing volume 210 for increasing the air pressure therein. An operator of the test could then spray soapy water on the motor unit housing 110 (for example along the parting line 114) for locating any leaks that could compromise the water resistance of the motor unit housing 110. The blow-off valve 386 is set to release air from the under-housing volume 210 when the air pressure therein reaches a predetermined air pressure in order to prevent damage to the components disposed in the motor unit housing 110. In some implementations, the blow-off valve 386 is set in order for the air pressure in the under-housing volume to not exceed 2 pounds per square inch (PSI). Third, the pressure gauge 382 provided on the service plug 380 enables the operator to check if the air pressure changes in the under-housing volume 210. It is contemplated that in some implementations changing the air pressure in the under-housing volume 210 could be performed by connecting a plug other than the service plug 380 or could be omitted entirely. For example, in implementations where there is no gap 206 and the air intake assembly 140 is fluidly connected directly to the air intake opening 200, the step 402 is not required as the air contained in the under-housing volume 210 is trapped therein and not in fluid communication with the exterior of the motor unit housing 110.

At step 404, the sealing valve 224*a* is closed for sealing a portion of the gas flow pathway downstream of the sealing valve 224*a* from a portion of the gas flow pathway upstream of the sealing valve 224*a*. When the sealing valve 224*a* is closed, the air contained in the under-housing volume 210 and in the air intake assembly 140 upstream of the sealing valve 224*a* is trapped, and the air pressure can be changed in the under-housing volume 210. At step 406, the sealing valve position sensor 342 senses the position of the sealing valve 224*a*. As described above, if the EMM 350 determines that the sealing valve 224*a* fails to close in response to the closing signal, the EMM 350 generates a fault signal at step 408 and sends signals to provide an indication of this to the operator of the test. The indication could be visual, such as a light turning on a console or laptop computer, or auditive, such as one or more beeps. It is contemplated that the step 404 could be omitted in some implementations, notably when the motor unit 106 includes an electric motor instead of the engine 116 or in implementations where there is no gap 206 and the air intake assembly 140 is fluidly connected directly to the air intake opening 200.

At step 410, after confirming that the sealing valve 224*a* is closed, the air pressure in the under-housing volume 210 is changed by controlling the air pump 230 disposed in the motor unit housing 110. The air pump 230 fluidly communicates the under-housing volume 210 to the air intake manifold 228 at a position downstream of the sealing valve 224*a*. More particularly, the air pump 230 has an outlet 230*a* fluidly connected to the air intake manifold 228 (FIGS. 3 and 4). The air pump 230 is operable for selectively conveying air from the under-housing volume 210 to the air intake manifold 228 and on to the portion of the gas flow pathway downstream of the sealing valve 224*a* to reduce the air pressure in the under-housing volume 210 of the motor unit housing 110. Conversely, it is contemplated that, in other implementations, the air pump 230 could be operable to increase the air pressure in the under-housing volume 210 of the motor unit housing 110 by supplying air from the portion of the gas flow pathway downstream of the sealing valve 224*a* to the under-housing volume 210. It is also contemplated that the step 410 could be performed without controlling the air pump 230, as an external air pump (not shown) could be fluidly connected to the connector 384 of the service plug 380 in order to supply (or withdraw) air to the under-housing volume 210 of the motor unit housing 110 for changing the air pressure therein. In other implementations, it is contemplated that the air pump 230 could supply air from the under-housing volume 210 of the motor unit housing 110 through a wall thereof and on to the atmosphere in order to decrease the air pressure in the under-housing volume 210. Conversely, it is also contemplated that the air pump 230 could supply air from the atmosphere into the under-housing volume 210 in order to increase the air pressure therein.

Still referring to FIG. 17, once the air pump 230 has been activated at step 410, then at step 412 change in the air pressure is monitored. The step 412 is automated by the EMM 350 receiving signals from the pressure sensor 354 and controlling the air pump 230. The monitoring of the change in the air pressure can also be performed by the operator using the pressure gauge 382.

Then, at step 414, the method 400 includes determining if a predetermined air pressure P is reached within a predetermined amount of time T1. In one example, the predetermined amount of time T1 is one minute after the activation of the air pump 230 and the predetermined pressure P is 1 PSI below atmospheric pressure. It is contemplated that the predetermined pressure P could be between 0.5 to 2 PSI below atmospheric pressure, but other values are contemplated. It is also contemplated that prior to step 410, the air pressure in the under-housing volume 210 could be measured by the pressure sensor 354 to form a baseline for step 414 and step 426 about to be described. If it is determined that the air pressure fails to reach the predetermined air pressure P within the predetermined amount of time T1, the EMM 350 indicates that the water resistance of the motor unit housing 110 is compromised by providing a warning indication to the operator and/or by registering a fault code at step 420. The step 420 is performed by providing one or more indications to the operator of the test. The indications could be visual, such as a light turning on a console or a laptop computer, or auditive, such as one or more beeps.

It is contemplated the step 414 could be performed by the operator controlling the air pump 230 manually and checking the air pressure using the pressure gauge 382 provided on the service plug 380. It is also contemplated that the step 414 could be replaced by only determining if the predetermined air pressure P is reached following the activation of the air pump 230 at step 410, without regard to time T1. If it is determined that the air pressure fails to reach the predetermined air pressure P, the step 420 is taken.

If it is determined that the air pressure reaches P within T1, then at step 422 the air pump 230 is stopped by the EMM 350. In other implementations, it is contemplated that the air pump 230 could be stopped by the EMM 350 once the predetermined air pressure P is reached following the activation of the air pump 230, without regard to time T1.

Then at step 424, the change in the air pressure is monitored for a predetermined amount of time T2. The predetermined amount of time T2 is an amount of time after the air pump 230 is stopped at step 422. In other implementations, it is contemplated that T2 could be an amount of time not related to the stopping of the air pump 230 at step 422. For example, T2 could be an amount of time since the activation of the air pump 230 at step 410. It is contemplated that T2 could be shorter than T1 in some implementations. By monitoring change in the air pressure in the under-housing volume 210 for the time T2, a decay of the partial vacuum created by the air pump 230 can be monitored over the time T2. If it is determined at step 426 that the change in the air pressure is within a predetermined range following the time T2, the water resistance of the motor unit housing 110 is confirmed at step 430. In some embodiments, the predetermined range is 50% of the difference between the predetermined pressure P and the atmospheric pressure, but other values are contemplated. The confirmation of the water resistance of the motor unit housing 110 is performed by providing one or more indications to the operator of the test. The indications could be visual, such as a light turning on a console or a laptop computer, or auditive, such as one or more beeps. Conversely, if it is determined at step 426 that the change in the air pressure is outside the predetermined range following the time T2, an indication that the water resistance is compromised is provided to the operator of the test at step 420.

In response to receiving an indication that the water resistance is compromised at step 420, actions to detect leaks in the motor unit housing 110 can be taken. These actions include, and are not limited to, spraying soapy water on the motor unit housing 110, supplying compressed air through the connector 384 and looking for the formation of bubbles on the motor unit housing 110 indicative of a leak, and checking the seal 115, the grommet 240*a* and pass-through connector 240*b* for leaks.

Following either one of steps 420 and 430, the method 400 further includes the step 440 of storing the test result in the data storage modules of the EMM 350. It is contemplated that the step 440 could be omitted in some implementations.

In an alternative embodiment of the method 400, steps 412 and 414 are omitted, and at step 422 the air pump 230 is stopped after a predetermined amount of time following the actuation of the air pump 230 at step 410. Steps 424 and 426 are then performed based on the pressure that is reached when the air pump 230 is stopped at step 422.

Modifications and improvements to the above-described implementations of the present technology may become apparent to those skilled in the art. The foregoing description is intended to be exemplary rather than limiting.

What is claimed is:

1. A marine motor assembly for mounting to a watercraft, the marine motor assembly comprising:
- a motor unit including:
  - a motor unit housing,
  - a motor disposed inside the motor unit housing,
  - a propulsion device operatively connected to the motor,
  - an air pump fluidly communicating with an under-housing volume of the motor unit housing,
  - a pressure sensor fluidly communicating with the under-housing volume for measuring air pressure in the under-housing volume of the motor unit housing; and
  - a control unit communicating with the air pump and the pressure sensor, the control unit being programmed for:
  - controlling the air pump for changing air pressure in the under-housing volume of the motor unit housing;
  - monitoring change in the air pressure for a predetermined amount of time; and
  - following the predetermined amount of time:
    - in response to determining that the change in air pressure is within a predetermined range, confirming that the motor unit housing is water-resistant, and
    - in response to determining that the change in air pressure is outside the predetermined range, indicating that the water resistance of the motor unit housing is compromised.

2. The marine motor assembly of claim 1, wherein the air pump fluidly communicates to an exterior of the motor unit housing.

3. The marine motor assembly of claim 1, wherein the pressure sensor is disposed inside the motor unit housing.

4. The marine motor assembly of claim 1, wherein the control unit is programmed for controlling the air pump to reduce air pressure in the under-housing volume.

5. The marine motor assembly of claim 1, wherein the control unit is programmed for controlling the air pump to stop the air pump when the air pressure in the under-housing volume reaches a predetermined air pressure.

6. The marine motor assembly of claim 1, wherein:

the predetermined amount of time is a first predetermined amount of time; and the control unit is programmed for generating a fault signal in response to determining that the air pressure fails to reach a predetermined air pressure within a second predetermined amount of time following an activation of the air pump.

7. The marine motor assembly of claim 1, wherein:

the motor is an internal combustion engine;

the motor unit housing defines an air intake opening fluidly communicating an exterior of the motor unit housing with the under-housing volume of the motor unit housing; and the motor unit further comprises an air intake assembly disposed in the motor unit housing, the air intake assembly defining an air inlet fluidly communicating with the air intake opening, the air intake assembly being fluidly connected to the at least one combustion chamber for supplying air to the at least one combustion chamber, the air intake assembly including a throttle valve; and the marine motor assembly further comprises:

an exhaust system fluidly communicating with the at least one combustion chamber for conveying exhaust gases from the at least one combustion chamber to an exterior of the marine motor assembly, the exhaust system defining an exhaust outlet, the air intake assembly, the at least one combustion chamber, and the exhaust system together defining at least in part a gas flow pathway, the air intake opening defining an upstream end of the gas flow pathway, the exhaust outlet defining a downstream end of the gas flow pathway; and a sealing valve provided in the gas flow pathway between the air intake opening and the exhaust outlet, the sealing valve having an open position permitting flow of gas therethrough, and the sealing valve having a closed position preventing flow of gas therethrough for sealing a portion of the gas flow pathway downstream of the sealing valve from a portion of the gas flow pathway upstream of the sealing valve.

8. The marine motor assembly of claim 7, further comprising a service plug selectively connected to the motor unit housing for sealing the air intake opening.

9. The marine motor assembly of claim 8, wherein the air pump is controlled for changing air pressure in the under-housing volume in response to:

the sealing valve being in the closed position, and the service plug being connected to the motor unit housing for sealing the air intake opening.

10. The marine motor assembly of claim 7, wherein, in the closed position, the sealing valve hermetically seals the portion of the gas flow pathway downstream of the sealing valve from the portion of the gas flow pathway upstream of the sealing valve.

11. The marine motor assembly of claim 10, wherein the sealing valve is disposed upstream of the engine.

12. The marine motor assembly of claim 7, further comprising:

an external conduit fluidly connected to the air intake opening and being disposed externally of the motor unit housing, at least one line extending from a component disposed inside the motor unit housing, the at least one line extending inside the external conduit, the at least one line being at least one of a power line, a communication line and a fuel line, and at least one grommet disposed between the at least one line and the motor unit housing for sealing the motor unit housing and pass-through of the at least one line.

13. The marine motor assembly of claim 1, further comprising a transom bracket connected to the motor unit housing; and wherein:

the transom bracket defines a tilt-trim axis; and a center of mass of the motor is disposed below the tilt-trim axis at least when the marine motor assembly is in a trim range.

14. A method for testing a water resistance of a motor unit housing of a marine motor assembly, the method comprising:

changing air pressure in an under-housing volume of the motor unit housing;

monitoring change in the air pressure for a predetermined amount of time; and following the predetermined amount of time:

in response to determining that the change in air pressure is within a predetermined range, confirming that the motor unit housing is water-resistant, and in response to determining that the change in air pressure is outside the predetermined range, indicating that the water resistance of the motor unit housing is compromised.

15. The method of claim 14, further comprising:

closing an air intake opening of the motor unit housing fluidly communicating an exterior of the motor unit housing with the under-housing volume of the motor unit housing; and closing a sealing valve provided in a gas flow pathway of the marine motor assembly for sealing a portion of the gas flow pathway downstream of the sealing valve from a portion of the gas flow pathway upstream of the sealing valve, the gas flow pathway being defined at least in part by an air intake assembly fluidly connected to the air intake opening, at least one combustion chamber, and an exhaust system of the marine motor assembly.

16. The method of claim 15, wherein closing the air intake opening comprises connecting a service plug to the motor unit housing.

17. The method of claim 15, wherein closing the sealing valve includes sending a closing signal to a valve actuator to close the sealing valve;

the method further comprising:

sensing a position of the sealing valve; and generating a fault signal in response to the sealing valve failing to close in response to the closing signal.

18. The method of claim 14, wherein changing air pressure in the under-housing volume of the motor unit housing further comprises controlling an air pump fluidly communicating with the under-housing volume of the motor unit housing.

19. The method of claim 18, wherein monitoring change in the air pressure further comprises:

determining if the air pressure in the under-housing volume of the motor unit housing has reached a predetermined air pressure following an activation of the air pump;

controlling the air pump to stop pumping air in response to determining that the air pressure in the under-housing volume of the motor unit housing has reached the predetermined air pressure; and wherein the predetermined amount of time is a predetermined amount of time after the air pump is stopped.

20. The method of claim 18, further comprising controlling the air pump to stop pumping air in response to determining that the air pressure in the under-housing volume of the motor unit housing has reached the predetermined air pressure.

21. The method of claim 14, wherein monitoring change in the air pressure further comprises:

determining if the air pressure in the under-housing volume of the motor unit housing has reached a predetermined air pressure; and in response to determining that the air pressure fails to reach the predetermined air pressure, indicating that the water resistance is compromised.

22. The method of claim 21, wherein:

the predetermined amount of time is a first predetermined amount of time, and monitoring change in the air pressure further comprises:

determining if the air pressure in the under-housing volume of the motor unit housing has reached the predetermined air pressure within a second predetermined amount of time; and in response to determining that the air pressure is not reached within the second predetermined amount of time, indicating that the water resistance of the motor unit housing is compromised.

23. The method of claim 14, wherein indicating that the water resistance is compromised comprises at least one of:

providing a warning indication to an operator of the test;

registering a fault code; and supplying compressed air in the under-housing volume of the motor unit housing.

* * * * *